(12) United States Patent
Lin et al.

(10) Patent No.: US 12,446,227 B2
(45) Date of Patent: Oct. 14, 2025

(54) STRUCTURE OF THREE-DIMENSIONAL MEMORY ARRAY

(71) Applicant: TAIWAN SEMICONDUCTOR MANUFACTURING COMPANY, LTD., Hsinchu (TW)

(72) Inventors: Meng-Han Lin, Hsinchu (TW); Feng-Cheng Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 623 days.

(21) Appl. No.: 17/675,391

(22) Filed: Feb. 18, 2022

(65) Prior Publication Data
US 2023/0269946 A1 Aug. 24, 2023

(51) Int. Cl.
| | |
|---|---|
| *H10B 51/10* | (2023.01) |
| *G11C 16/04* | (2006.01) |
| *H01L 23/528* | (2006.01) |
| *H10B 51/20* | (2023.01) |
| *H10B 51/50* | (2023.01) |
| *H10D 84/01* | (2025.01) |
| *H10D 84/03* | (2025.01) |

(52) U.S. Cl.
CPC ......... *H10B 51/20* (2023.02); *G11C 16/0483* (2013.01); *H01L 23/5283* (2013.01); *H10B 51/10* (2023.02); *H10B 51/50* (2023.02); *H10D 84/0149* (2025.01); *H10D 84/038* (2025.01)

(58) Field of Classification Search
None
See application file for complete search history.

(56) References Cited

U.S. PATENT DOCUMENTS

| | | | |
|---|---|---|---|
| 2017/0207220 A1* | 7/2017 | Yun | H01L 21/76816 |
| 2021/0043828 A1* | 2/2021 | Hong | H10B 61/22 |
| 2021/0098029 A1 | 4/2021 | Kim et al. | |

(Continued)

FOREIGN PATENT DOCUMENTS

| | | |
|---|---|---|
| TW | 202123436 A | 6/2021 |
| TW | 202201753 A | 1/2022 |

OTHER PUBLICATIONS

Taiwanese Search Report for Taiwanese Application No. 111114478, dated Jan. 31, 2023, with English an translation.

*Primary Examiner* — Eliseo Ramos Feliciano
*Assistant Examiner* — William Henry Anderson
(74) *Attorney, Agent, or Firm* — Birch, Stewart, Kolasch & Birch, LLP

(57) ABSTRACT

A 3D memory array includes a tableland feature formed with multiple 3D memory sub-arrays that are arranged in an X-axis direction. Each 3D memory sub-array includes multiple memory cells that are distributed in multiple columns arranged in the X-axis direction, multiple bit lines extending in a Z-axis direction, multiple source lines extending in the Z-axis direction, and multiple word lines extending in a Y-axis direction. Each memory cell includes a first electrode, a second electrode and a gate electrode. Each bit line interconnects the first electrodes of some of the memory cells aligned in the Z-axis direction. Each bit line is electrically connected to another bit line of the same 3D memory sub-array, which is aligned with the bit line in the X-axis direction, and is electrically isolated from the bit lines of another 3D memory sub-array.

20 Claims, 20 Drawing Sheets

(56) References Cited

U.S. PATENT DOCUMENTS

| | | | |
|---|---|---|---|
| 2021/0175251 A1* | 6/2021 | Zhang | G11C 11/223 |
| 2022/0028894 A1* | 1/2022 | Yang | H10D 30/6755 |
| 2022/0285395 A1* | 9/2022 | Yang | H10B 51/30 |
| 2022/0336347 A1* | 10/2022 | Lai | H01L 29/792 |
| 2022/0359555 A1* | 11/2022 | Toyama | H01L 25/18 |
| 2022/0367487 A1* | 11/2022 | Zhang | H10D 62/115 |
| 2024/0381665 A1* | 11/2024 | Lin | H10B 51/30 |

\* cited by examiner

STRUCTURE OF THREE-DIMENSIONAL MEMORY ARRAY

BACKGROUND

A two-dimensional (2D) memory array includes a plurality of memory cells that are arranged in columns and rows and that are connected by a plurality of bit lines defining the columns and a plurality of word lines defining the rows. Three-dimensional (3D) memory array architecture is a collection of multiple 2D memory arrays. 3D memory array architecture can provide higher cell density within a given chip area in comparison to 2D memory array architecture.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
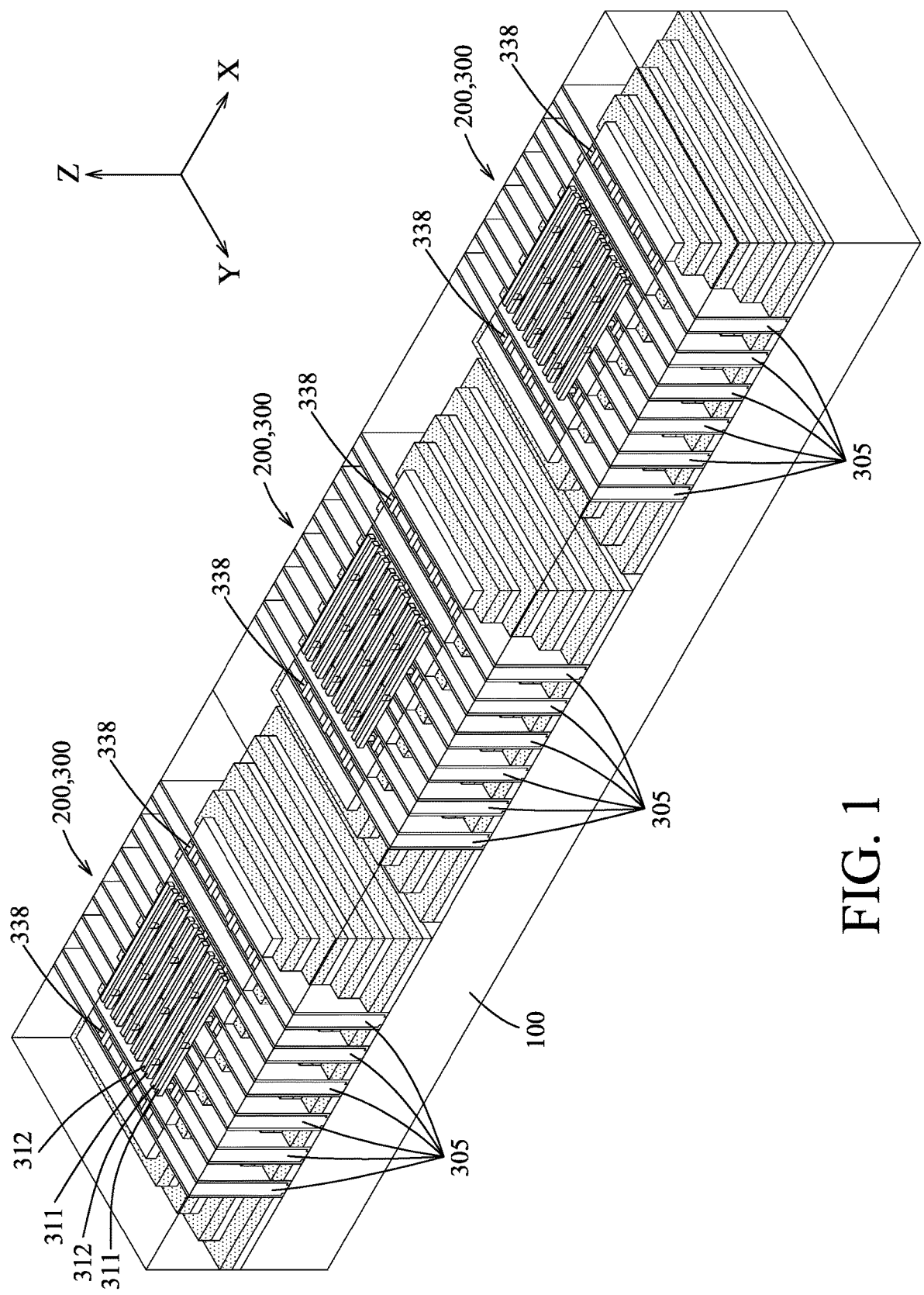
FIG. 1 illustrates a schematic view of a structure of a 3D memory array in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "above," "over," "downwardly," "upwardly," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a first embodiment of a structure of a 3D memory array according to this disclosure. The structure of the 3D memory array includes a substrate 100, and a plurality of 3D memory sub-arrays 300 (each being referred to as a sub-array 300 hereinafter) formed over the substrate 100.

The substrate 100 may be a bulk semiconductor substrate or a semiconductor-on-insulator (SOI) substrate, which may be doped (e.g., with a p-type or an n-type dopant) or undoped. In some embodiments, an SOI substrate includes a layer of a semiconductor material formed on an insulator layer. The insulator layer may be a buried oxide (BOX) layer, a silicon oxide layer or any other suitable layer. The insulator layer may be provided on a suitable substrate, such as silicon, glass or the like. The substrate 100 may be made of a suitable semiconductor material, such as silicon or the like. In some embodiments, the substrate 100 is a silicon wafer; and in other embodiments, the substrate 100 is made of a compound semiconductor such as silicon carbide, gallium arsenide, indium arsenide, indium phosphide or other suitable materials. In still other embodiments, the substrate 100 is made of an alloy semiconductor such as GaAsP, AlInAs, AlGaAs, GaInAs, GaInP, GaInAsP or other suitable materials.

In some embodiments, the substrate 100 includes various p-type doped regions and/or n-type doped regions, such as p-type wells, n-type wells, p-type source/drain features and/or n-type source/drain features, formed by a suitable process such as ion implantation, thermal diffusion, a combination thereof, or the like. In some embodiments, the substrate 100 may include other functional elements such as resistors, capacitors, diodes, transistors, and/or the like. The transistors are, for example, field effect transistors (FETs), such as planar FETs and/or 3D FETs (e.g., fin field effect transistors (FinFETs)). The substrate 100 may include lateral isolation features (e.g., shallow trench isolation (STI)) configured to separate various functional elements formed on and/or in the substrate 100. For example, the substrate 100 may include transistors that constitute driver circuits for the 3D memory array. In the embodiments of this disclosure, the 3D memory array is exemplified as a 3D NOR FeRAM (ferroelectric random-access memory) array, but this disclosure is not limited in this respect. In some embodiments, the 3D memory array may be realized as a 3D NAND memory array. In some embodiments, the 3D memory array may be realized using other types of memory technologies, such as flash memory, MRAM (magnetoresistive random-access memory), PMC (programmable metallization cell), PCM (phase-change memory), ReRAM (resistive random-access memory), or other suitable memory technologies.

Figure 2:
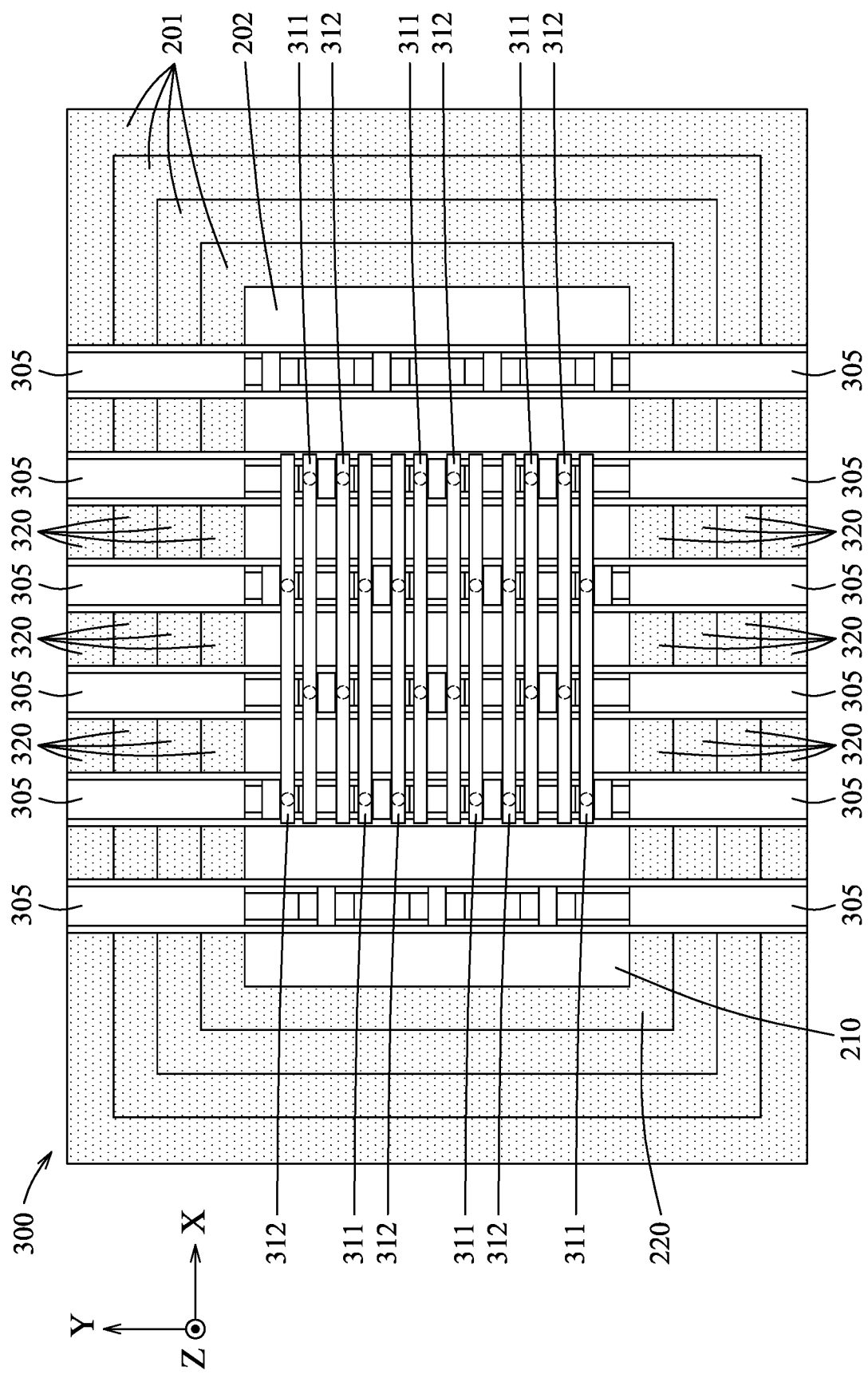
FIG. 2 illustrates a top view of a single tableland feature of the 3D memory array as depicted in FIG. 1.

In the first embodiment, the sub-arrays 300 are respectively formed in a plurality of tableland features 200 that are arranged in an X-axis direction and separated from each other. FIG. 2 illustrates a top view of a single tableland feature 200. In each of the tableland features 200, the sub-array 300 formed therein is defined by multiple bit-line-source-line-connection-wire pairs, with each pair including a bit-line connection wire 311 and a source-line connection wire 312, and by a plurality of word lines 320 transverse to the bit-line connection wires 311 and the source-line connection wires 312. The bit-line connection wires 311 extend in the X-axis direction, and are arranged in parallel in a Y-axis direction. The source-line connection wires 312 extend in the X-axis direction, and are arranged in parallel in the Y-axis direction. The word lines 320 are parallel to each other, and extend in the Y-axis direction.

Figure 3:
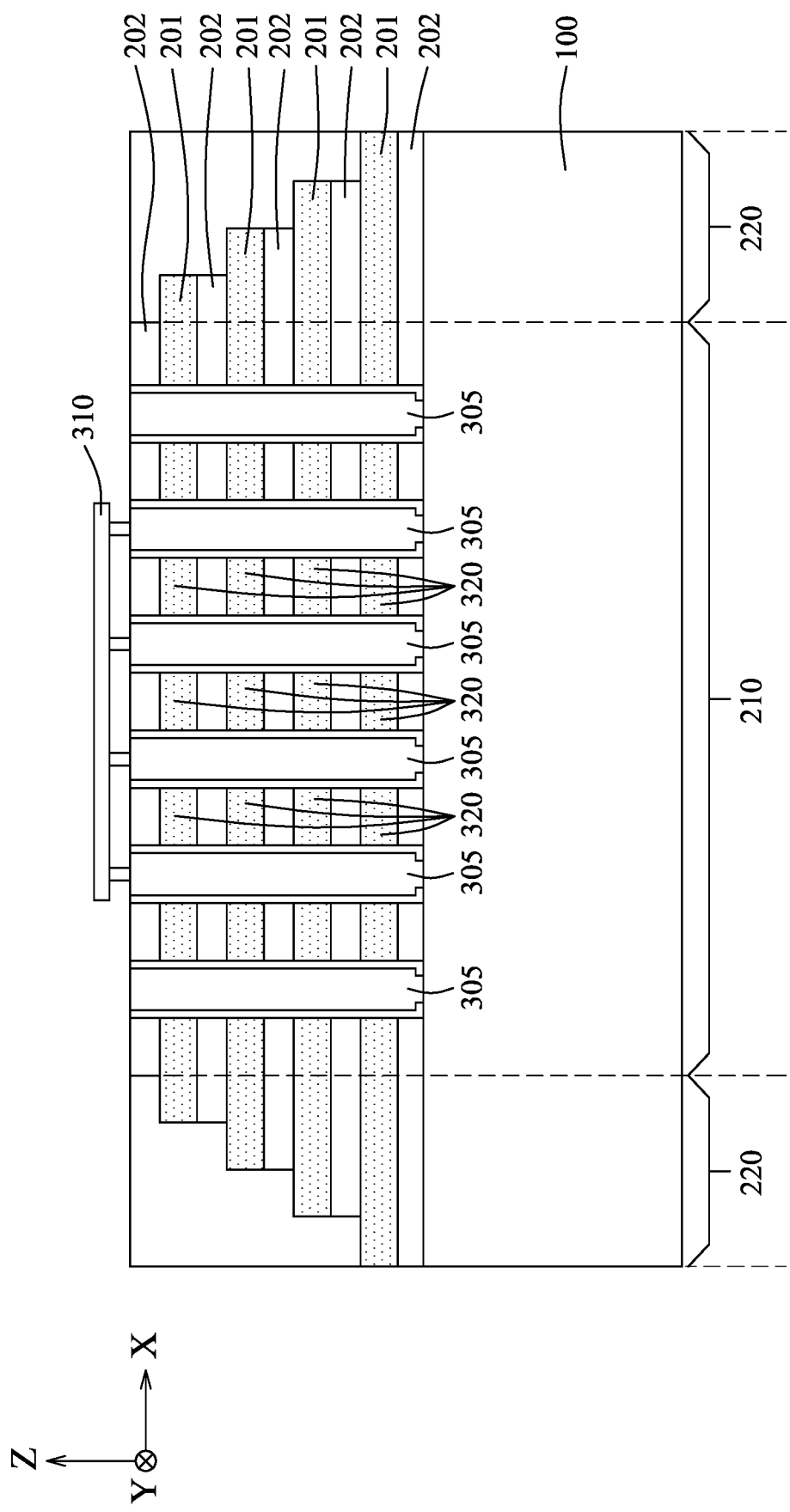
FIG. 3 illustrates a front view of a single tableland feature of the 3D memory array as depicted in FIG. 1.

Each of the tableland features 200 includes multiple metal layers 201 and multiple isolation layers 202 that are alternately stacked together in a Z-axis direction, as shown in FIG. 3, which is a front view of a single tableland feature 200 along the Y-axis direction. The X-axis direction, the Y-axis direction and the Z-axis direction are transverse to each other. In the illustrative embodiment, the X-axis direction, the Y-axis direction and the Z-axis direction are perpendicular to each other. The metal layers 201 are patterned to form the word lines 320 that are separated by word-line isolation features 305. The word lines 320 are distributed in multiple columns that are separated from each other in the X-axis direction. In each of the columns of the word lines 320, the word lines 320 are distributed in multiple layers that are arranged in the Z-axis direction. Each of the tableland features 200 can be divided into a plain portion 210 and a staircase portion 220. The staircase portion 220 is connected to and surrounds the plain portion 210. Such a structure is made by film stack deposition, stair etch, and so on. The stair etch is used to reveal edge portions of each of the metal layers 201, so the word lines 320 in different metal layers 201 can be electrically connected to, for example but not limited to, a driver circuit (not shown) for the sub-array 300. Since the stair etch is an isotropic process, the staircase portion 220 will be formed at each side of the tableland feature 200, and thus surround the plain portion 210. The staircase portion 220 includes multiple metal layers 201 and multiple isolation layers 202 that are alternately stacked together in the Z-axis direction, and the metal layers 201 in the staircase portion 220 can be deemed as being formed with a plurality of extensions of the word lines 320 of the sub-array 300 that are electrically connected to the word lines 320 of the sub-array 300, respectively, where each of the extensions extends outside of an area covered by any of the isolation layer(s) 202 disposed over the extension, and thus is partially uncovered by the isolation layers 202 in the staircase portion 220. For each of the tableland features 200, the sub-array 300 is formed in the plain portion 210. Two adjacent sub-arrays 300 are separated from each other in the X-axis direction by the staircase portions 220 of the tableland features 200 in which the sub-arrays 300 are formed.

Figure 4:
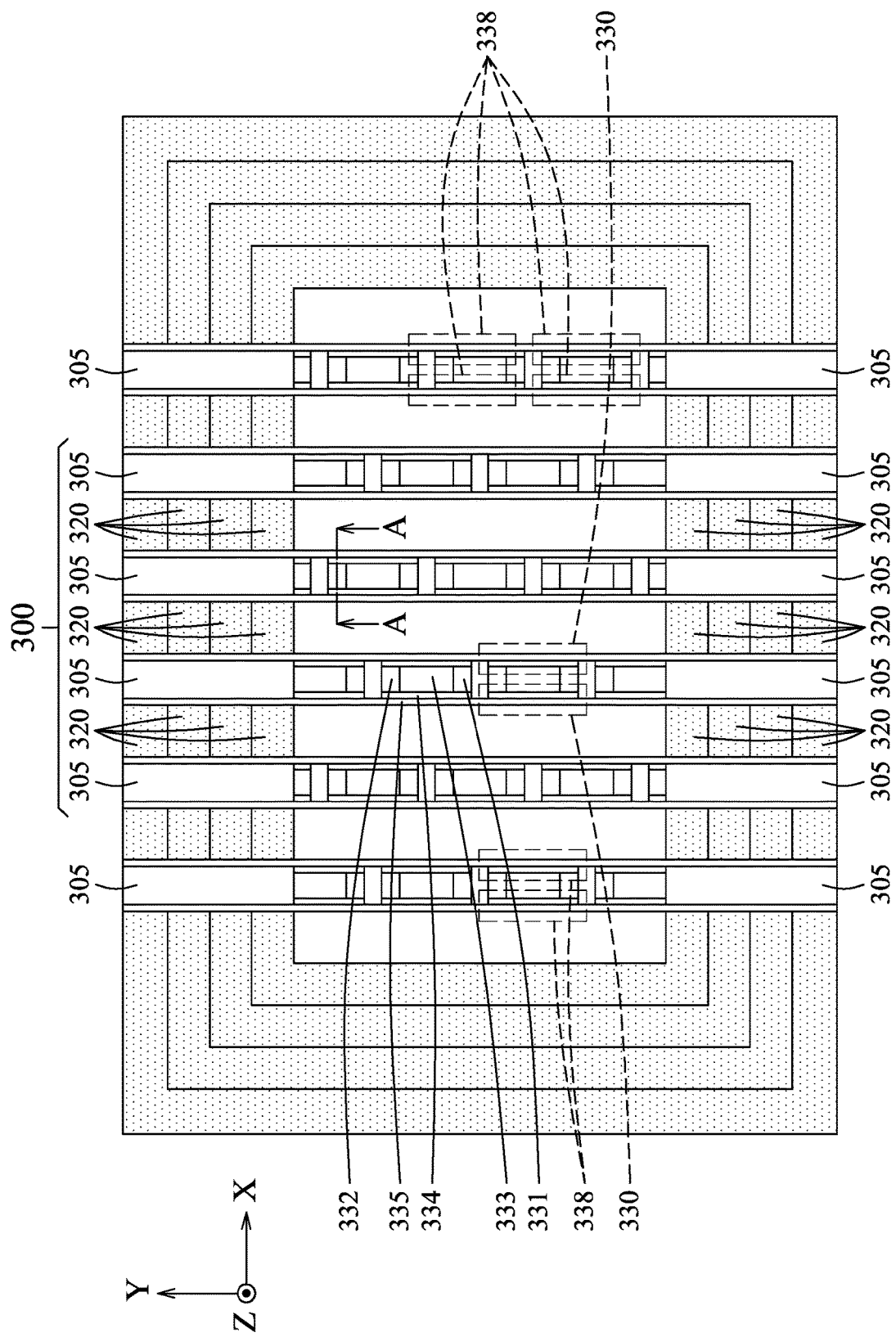
FIG. 4 illustrates a top view of a single tableland feature of the 3D memory array as depicted in FIG. 1, with bit-line connection wires and source-line connection wires being omitted.

Referring to FIG. 4, which is similar to FIG. 2, a top view of a single tableland feature 200 is illustrated with the bit-line connection wires 311 and the source-line connection wires 312 being omitted. The sub-array 300 includes a plurality of memory cells 330 that are distributed in multiple columns, which extend in the Y-axis direction and are arranged in the X-axis direction. In each of the columns of the memory cells 330, the memory cells 330 are distributed in multiple layers that are arranged in the Z-axis direction, where each layer corresponds in position to a respective one of the metal layers 201 (e.g., at the same height level as the corresponding one of the metal layers 201). It is noted that a single column of the memory cells 330 contains two lines (or sub-columns) of the memory cells 330, where each line of the memory cells 330 corresponds to a respective one of two adjacent word lines 320 that sandwich the column of the memory cells 330 therebetween. Further referring to FIG. 5, each of the memory cells 330 includes a transistor (e.g. thin film transistor) having a gate electrode that is electrically connected to a word line 320, a first source/drain electrode 331, a second source/drain electrode 332, a source-drain isolation feature 333 to isolate the first source/drain electrode 331 from the second source/drain electrode 332, a channel feature 334, and a gate dielectric feature 335, where the gate electrode and the word line 320 are integrally formed together in the corresponding metal layer 201. In this embodiment, since the 3D memory array is exemplified as an FeRAM array, the gate dielectric feature 335 is made of a ferroelectric material that may include, for example, strontium bismuth tantalite (SBT), lead zirconate titanate (PZT), hafnium zirconium oxide (HZO), binary oxide (e.g., hafnium oxide ($H_xO2$), ternary oxide (e.g., hafnium silicate ($HfSiO_x$), hafnium zirconate ($HfZrO_x$), barium titanate ($BaTiO_3$), lead titanate ($PbTiO_3$), strontium titanate ($SrTiO_3$), calcium manganite ($CaMnO_3$), bismuth ferrite ($BiFeO_3$), aluminum scandium nitride (AlScN), aluminum gallium nitride (AlGaN), aluminum yttrium nitride (AlYN)), quaternary oxides (e.g., barium strontium titanate ($BaSrTiOx$)), some other suitable ferroelectric material(s), or any combination thereof. The hafnium oxide may be doped using, for example, zirconium (Zr), silicon (Si), yttrium (Y), aluminum (Al), gadolinium (Gd), lanthanum (La), strontium (Sr), other suitable elements, or any combination thereof.

Figure 6:
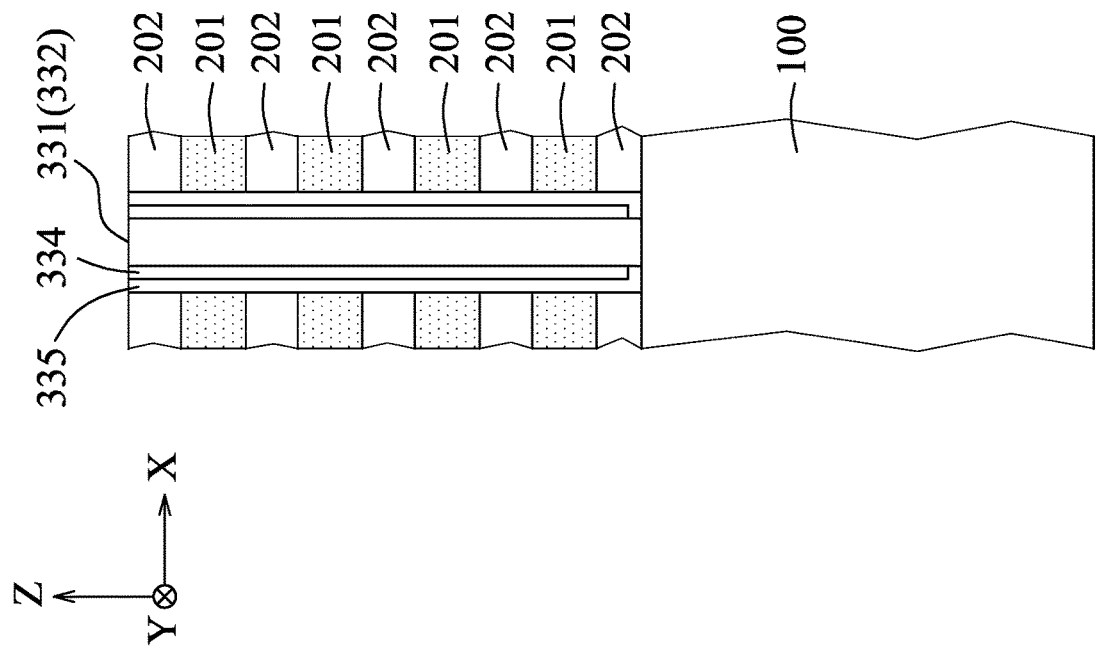
FIG. 6 illustrates a fragmentary sectional view taken along line A-A in FIG. 4.

FIG. 6 illustrates a sectional view of the sub-array 300 along line A-A in FIG. 4. Each of the source/drain electrode 331 (or 332), the channel feature 334 and the gate dielectric feature 335 extends in the Z-axis direction. Therefore, the TFTs that are aligned in the Z-axis direction in different layers of the memory cells 330 are formed using the same film of channel material and the same film of gate dielectric material. The first source/drain electrodes 331 of the TFTs that are aligned in the Z-axis direction are electrically connected together to form a bit line (also denoted by the reference numeral "331" hereinafter) that extends in the Z-axis direction, and the second source/drain electrodes 332 of the TFTs that are aligned in the Z-axis direction are electrically connected together to form a source line (also denoted by the reference numeral "332" hereinafter) that extends in the Z-axis direction.

Referring to FIGS. 2 and 4, a single word line 320 corresponds to two adjacent lines of the memory cells 330 that respectively correspond to different columns of the memory cells 330 in the same layer, and the memory cells 330 in two adjacent columns are staggered. For each of the sub-arrays 300, each of the bit-line connection wires 311 interconnects the bit lines 331 of odd-numbered or even-numbered columns of the memory cells 330 that are aligned in the X-axis direction, each of the source-line connection wires 312 interconnects the source lines 332 of odd-numbered or even-numbered columns of the memory cells 330 that are aligned in the X-axis direction, and each of the word lines 320 interconnects the gate electrodes of the TFTs of the memory cells 330 that are aligned in the Y-axis direction.

In the first embodiment, the sub-array 300 in each of the tableland features 200 is disposed between two columns of dummy memory cells 338. The dummy memory cells 338 have the same structure as the memory cells 330 of the sub-array 300, but are not being used because photolithographic processes usually have lower uniformity at edge portions of a pattern, making the outermost two columns of memory cells 338 have relatively poorer performance.

Figure 7:
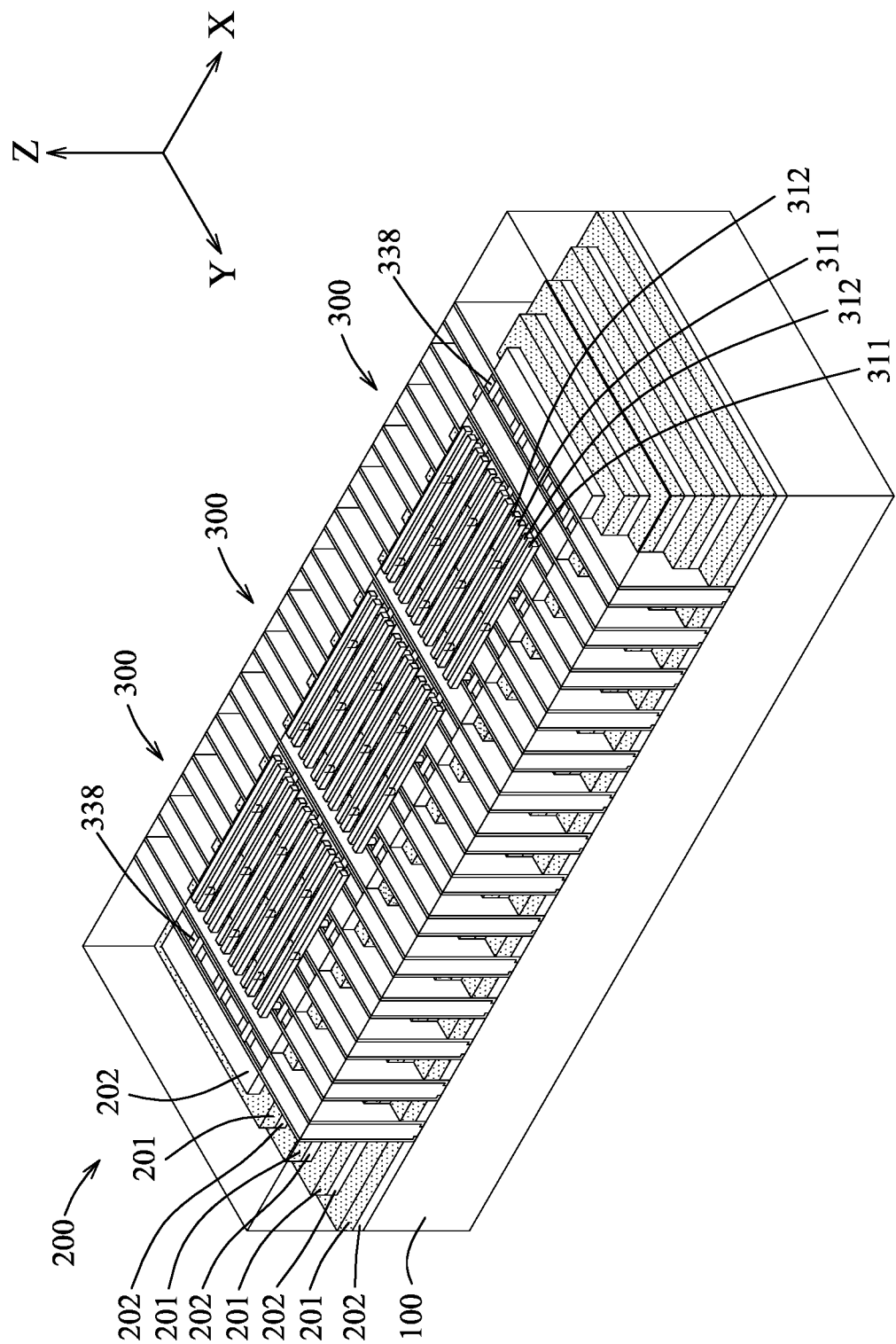
FIG. 7 illustrates a schematic view of a structure of a 3D memory array in accordance with some embodiments.
Figure 8:
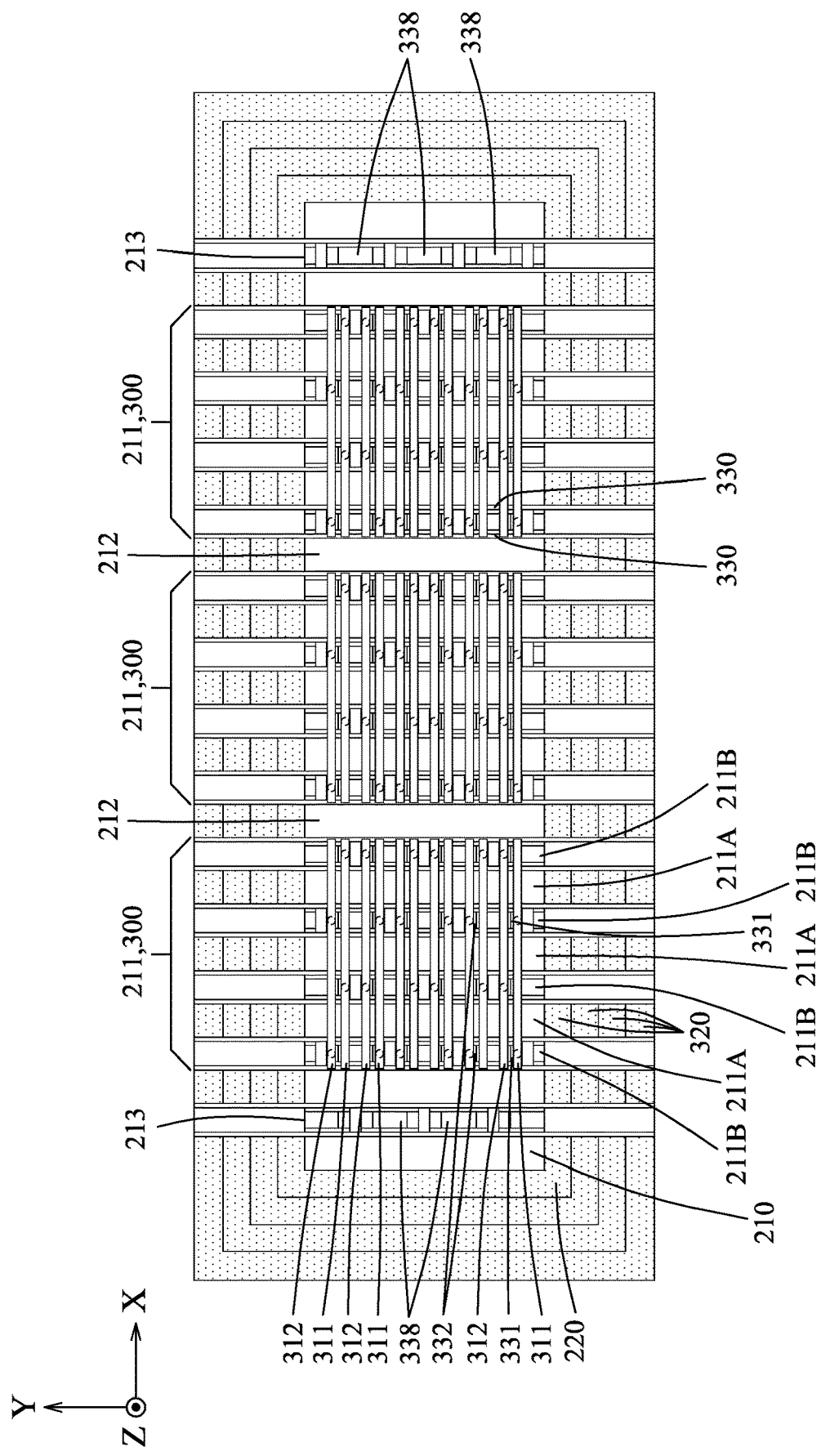
FIG. 8 illustrates a top view of a tableland feature of the 3D memory array as depicted in FIG. 7.

FIGS. 7 and 8 illustrate a second embodiment of a structure of a 3D memory array according to this disclosure. The structure of the memory cells 330 of the 3D memory array in the second embodiment is the same as that in the first embodiment, so details thereof are not repeated herein for the sake of brevity. The second embodiment differs from the first embodiment in that a single tableland feature 200, which is formed over the substrate 100, has multiple sub-arrays 300 formed in the plain portion 210 thereof and arranged in the X-axis direction, where the plain portion 210 is surrounded by the staircase portion 220, and the sub-arrays 300 are disposed between two columns of the dummy memory cells 338 (i.e., the outermost two columns of memory cells in the X-axis direction). Each of the sub-arrays 300 is similar to that introduced in the first embodiment, and is defined by multiple bit-line-source-line-connection-wire pairs with each pair including a bit-line connection wire 311 and a source-line connection wire 312, and by a plurality of word lines 320 transverse to the bit-line connection wires 311 and the source-line connection wires 312. For each of the sub-arrays 300, the bit lines 331 that are aligned in the X-axis direction are electrically connected together through one of the bit-line connection wires 311, and the source lines 332 that are aligned in the X-axis direction are electrically connected together through one of the source-line connection wires 312. However, the bit-line connection wires 311 of each of the sub-arrays 300 are electrically isolated and spaced apart from those of another sub-array 300 in the X-axis direction, so the bit lines 331 of different sub-arrays 330 that are aligned in the X-axis direction are electrically isolated from each other.

In the second embodiment, the plain portion 210 of the tableland feature 200 can be divided into multiple sub-array segments 211, at least one interconnecting segment 212, and two dummy cell segments 213, where the sub-array segments 211 and the interconnecting segment(s) 212 are sandwiched between the dummy cell segments 213, and are alternately arranged in the X-axis direction. In the illustrative embodiment as shown in FIGS. 7 and 8, the plain portion 210 of the tableland feature 200 has three sub-array segments 211 and two interconnecting segments 212 that are sandwiched between the dummy cell segments 213, but this disclosure is not limited in this respect. In other implementations of the second embodiment, the plain portion 210 may have two or more than three sub-array segments 211 formed therein. Each of the sub-array segments 211 has a respective one of the sub-arrays 300 formed therein, and has multiple layers of the memory cells 330 that are stacked in the Z-axis direction and that are separated from each other by the isolation layers 202. Each of the sub-array segments 211 can be divided into multiple word-line regions 211A and multiple cell regions 211B that are alternately arranged in the X-axis direction. Each of the word-line regions 211A has a stack structure composed of multiple metal layers 201 and multiple isolation layers 202 that are alternately stacked together in the Z-axis direction (see the left or right portion of the structure shown in FIG. 6), and each of the cell regions 211B includes the gate dielectric feature 335 formed on a sidewall of an adjacent word-line region 211A, the channel feature 334 formed on the gate dielectric feature 335, the bit line 331 and the source line 332 that are in contact with the channel feature 334, and the source-drain isolation feature 333 (see FIGS. 5 and 6). Each of the interconnecting segments 212 has a stack structure composed of multiple metal layers 201 and multiple isolation layers 202 that are alternately stacked together in the Z-axis direction, and is disposed between and interconnects two of the sub-array segments 211 that are adjacent in the X-axis direction, so as to separate the bit-line connection wires 311 of the sub-array 300 in one of said two of the sub-array segments 211 from the bit-line connection wires 311 of the sub-array 300 in the other one of said two of the sub-array segments 211. Specifically, each of the interconnecting segments 212 has the same structure and the same width in the X-axis direction as a single word-line region 211A, so the memory cells 330 of all of the sub-arrays 300 in the tableland feature 200 are distributed as a large memory cell array where the memory cells 330 are distributed in multiple columns that extend in the Y-axis direction and that are equidistantly arranged in the X-axis direction. As a result, performance of the memory cells 330 of the sub-arrays 300 would be uniform. In the second embodiment, since multiple sub-arrays 300 that are arranged in the X-axis direction are integrated into one tableland feature 200, staircases are not present between adjacent sub-arrays 300, so chip area can be saved. Furthermore, a number of the columns of dummy memory cells 338 is reduced in comparison to the first embodiment by virtue of forming multiple sub-arrays 300 in one tableland feature 200. Referring to FIGS. 1 and 7, the first embodiment has six columns of the dummy memory cells 338 for three sub-arrays 300, and the second embodiment, in which one tableland feature 200 includes three sub-arrays 300 formed therein, has only two columns of the dummy memory cells 338. As a result, chip area is further saved in the second embodiment because of the reduction of the dummy memory cells 338.

Figure 9:
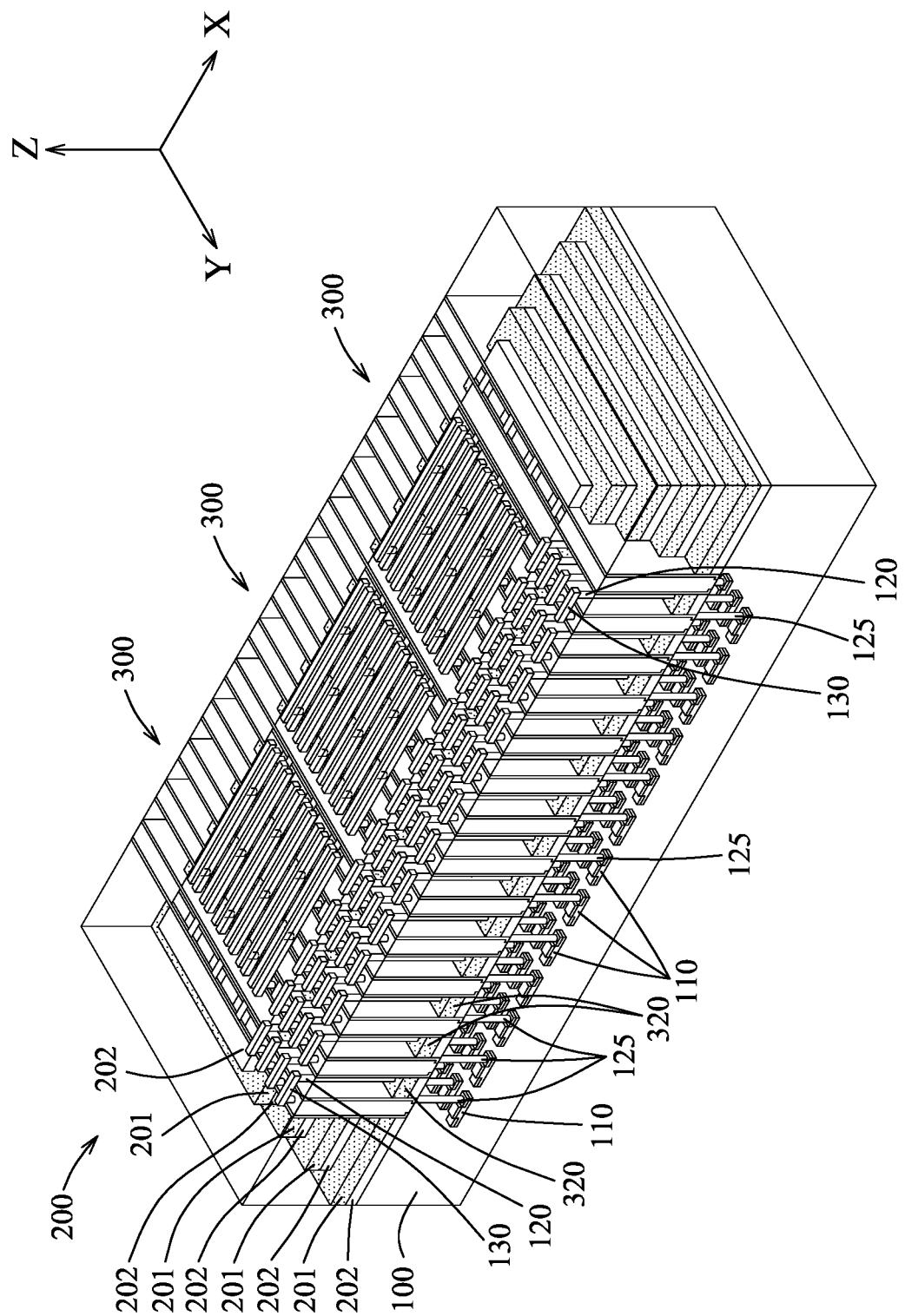
FIG. 9 illustrates a schematic view of a structure of a 3D memory array in accordance with some embodiments.

FIG. 9 exemplarily illustrates a structure of CMOS under array. In some embodiments, a plurality of CMOS driving transistors 110 are formed in the substrate 100 that is under the 3D memory array, and are configured to, for example, drive operation of the memory cells 330, but this disclosure is not limited in this respect. In the illustrative embodiment, the CMOS driving transistors 110 are arranged in an array, and correspond in position to revealed edge portions of the word lines 320, respectively. For each of the word lines 320, a first contact via 120 that extends in the Z-axis direction is formed to be connected to a top surface of the revealed edge portion of the word line 320, a second contact via 125 that extends in the Z-axis direction is formed to pass through the word-line isolation feature 305 that is adjacent to the word line 320 to be connected to one of the CMOS driving transistors 110, and a connection wire 130 that extends in the X-axis direction is formed to interconnect upper portions of the first contact via 120 and the second contact via 125. As a result, each of the CMOS driving transistors 110 is electrically connected to a corresponding one of the word lines 320 for driving operation of those of the memory cells 330 of which the gate electrodes are electrically connected to the word line 320. By virtue of the CMOS driving transistors 110 respectively corresponding in position to the revealed edge portions of the word lines 320, the second contact vias 125 can be directly connected to the corresponding CMOS driving transistors 110, and no additional metal layers are required for connecting the second contact vias 125 to the CMOS driving transistors 110. In the illustrative embodiment, the CMOS driving transistors 110 are disposed at one side of the plain portion 210 in which the 3D memory array is formed. In some embodiments, the CMOS driving transistors 110 may be disposed at opposite sides of the plain portion 210. For example, the CMOS driving transistors 110 that correspond to odd-numbered columns of the memory cells 330 may be arranged at one side of the plain portion 210, and the CMOS driving transistors 110 that correspond to the even-numbered columns of the memory cells 330 may be arranged at the other side of the plain portion 210, so an average area to be occupied by a single CMOS driving transistor 110 becomes larger, and the CMOS driving transistor 110 can be made larger to enhance driving capability.

Figure 10:
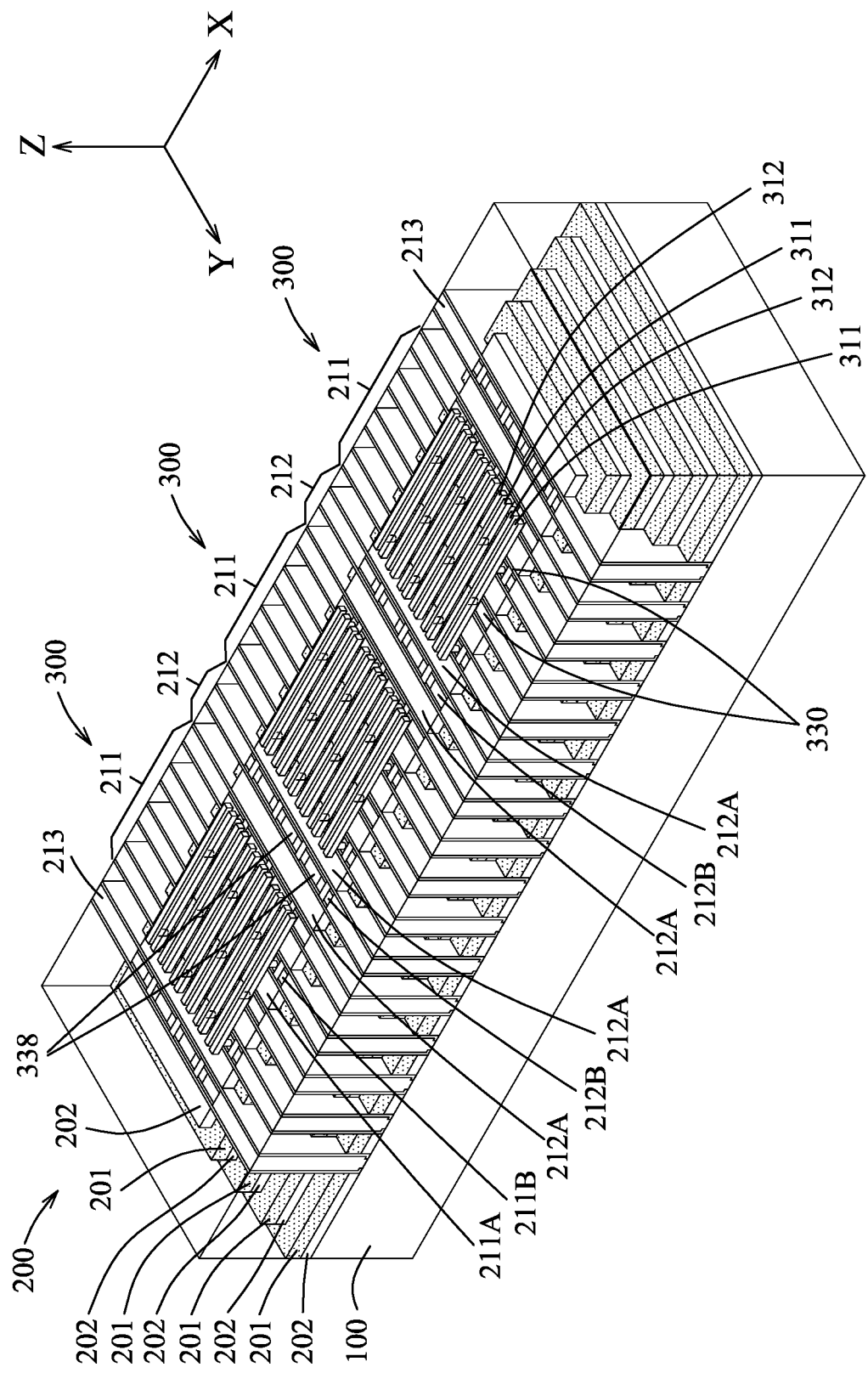
FIG. 10 illustrates a schematic view of a structure of a 3D memory array in accordance with some embodiments.

FIG. 10 illustrates a third embodiment of a structure of a 3D memory array according to this disclosure, which is a variation of the second embodiment. The third embodiment differs from the second embodiment in that each of the interconnecting segments 212 of the third embodiment includes multiple word-line regions 212A and at least one dummy cell region 212B that are alternately arranged in the X-axis direction. Each of the word-line regions 212A is identical to a single word-line region 211A of the sub-array segments 211. Each of the dummy cell region(s) 212B is identical to a single cell region 211B of the sub-array segments 211, and includes a plurality of dummy memory cells 338. As a result, the memory cells 330 of all of the sub-arrays 300 in the sub-array segments 211 and the dummy cells 338 in the interconnecting segment(s) 212 are distributed as a large memory cell array where the memory cells (including the memory cells 330 in the sub-array segments 211 and the dummy memory cells 338 in the interconnecting segment(s) 212) are distributed in multiple columns extending in the Y-axis direction and are equidistantly arranged in the X-axis direction. As a result, performance of the memory cells 330 of the sub-arrays 300 would be uniform. In comparison to the first embodiment, the third embodiment uses less chip area for the same number of sub-arrays 300 because the third embodiment does not have staircase structures between adjacent sub-arrays 300, and has fewer columns of dummy memory cells 338.

Figure 11:
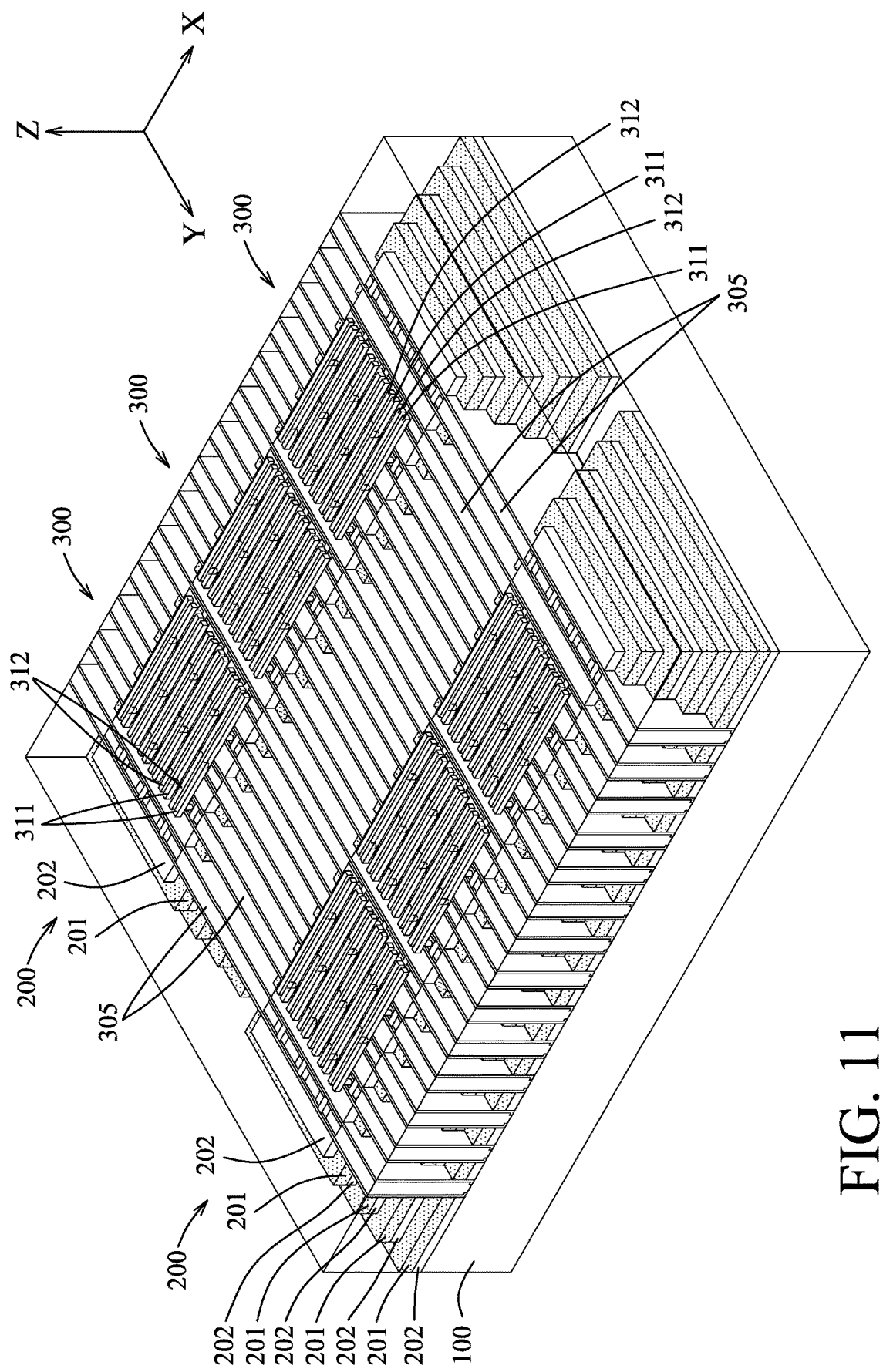
FIG. 11 illustrates a schematic view of a structure of a 3D memory array in accordance with some embodiments.

FIG. 11 illustrates a fourth embodiment of a structure of a 3D memory array according to this disclosure, which is a variation of the second embodiment. The fourth embodiment differs from the second embodiment in that the 3D memory array of the fourth embodiment includes multiple rows of the sub-arrays 300 with the rows being arranged in the Y-axis direction. In the illustrative embodiment, the 3D memory array of the fourth embodiment includes but not limited to six sub-arrays 300 that are arranged in two rows and three columns. The six sub-arrays 300 are formed in two tableland features 200 that are aligned in the Y-axis direction and that are electrically isolated from each other. Each of the tableland features 200 includes three of the sub-arrays 300 arranged in a row that extends in the X-axis direction. The tableland features 200 that are aligned and adjacent in the Y-axis direction are connected to each other by the word-line isolation features 305, which are disposed in the staircase portions of the tableland features 200 and which extend from the columns of the memory cells 330 of the sub-arrays 300 formed in the tableland features 200. By virtue of forming multiple rows of the sub-arrays 300 in multiple tableland features 200 that are arranged in the Y-axis direction, chip area can be used more efficiently and flexibly.

Figure 12:
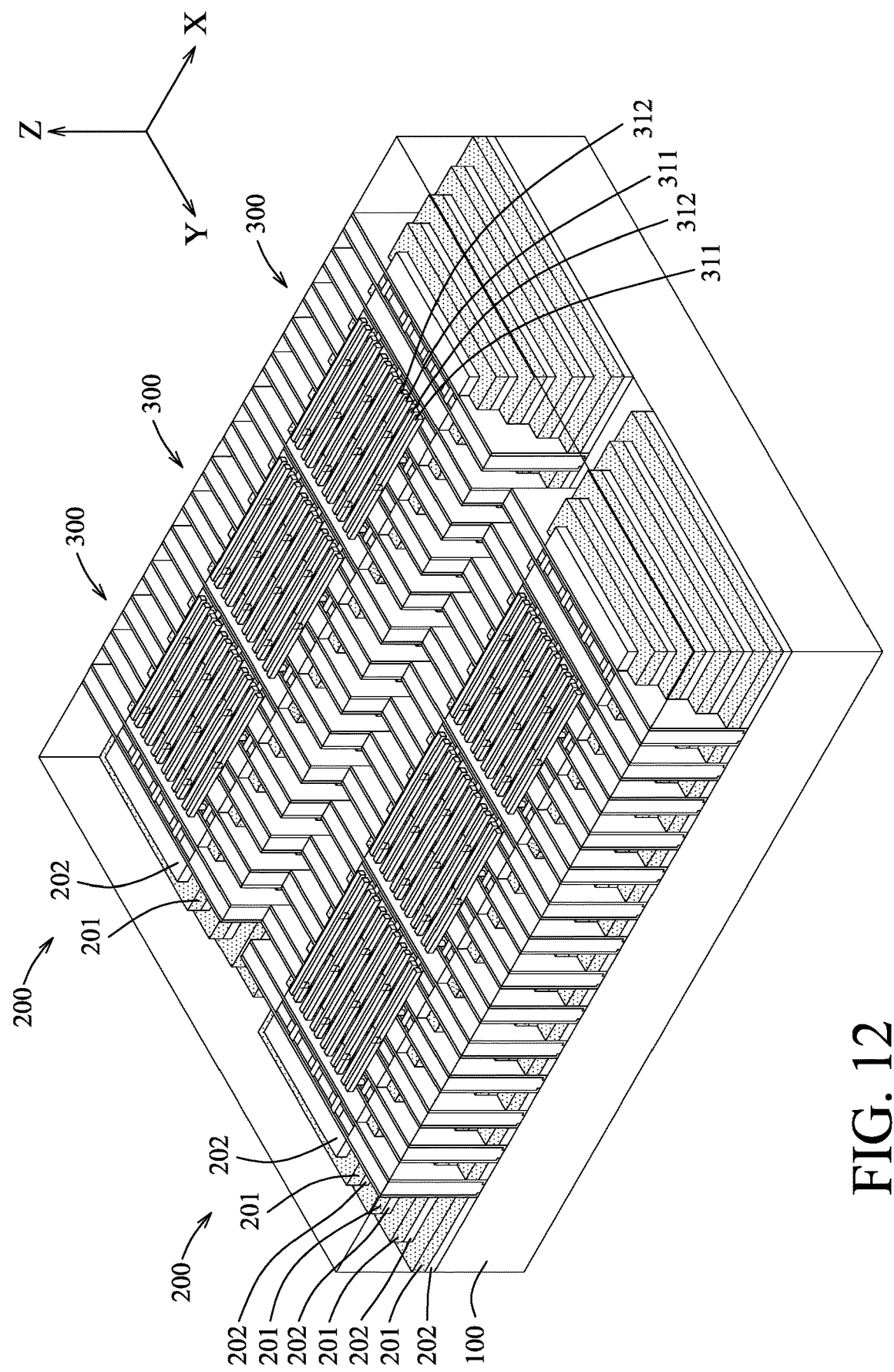
FIG. 12 illustrates a schematic view of a structure of a 3D memory array in accordance with some embodiments.

FIG. 12 illustrates a fifth embodiment of a structure of a 3D memory array according to this disclosure, which is a variation of the second embodiment. The fifth embodiment differs from the second embodiment in that the 3D memory array of the fifth embodiment includes multiple rows of the sub-arrays 300, with the rows being arranged in the Y-axis direction. In the illustrative embodiment, the 3D memory array of the fifth embodiment includes but not limited to six sub-arrays 300 that are arranged in two rows and three columns. The six sub-arrays 300 are formed in two tableland features 200 that are aligned in the Y-axis direction. Each of the tableland features 200 includes three of the sub-arrays 300 arranged in a row that extends in the X-axis direction. The tableland features 200 that are adjacent in the Y-axis direction are separated from each other. By virtue of forming multiple rows of the sub-arrays 300 in multiple tableland features 200 that are arranged in the Y-axis direction, chip area can be used more efficiently and flexibly.

Figure 13:
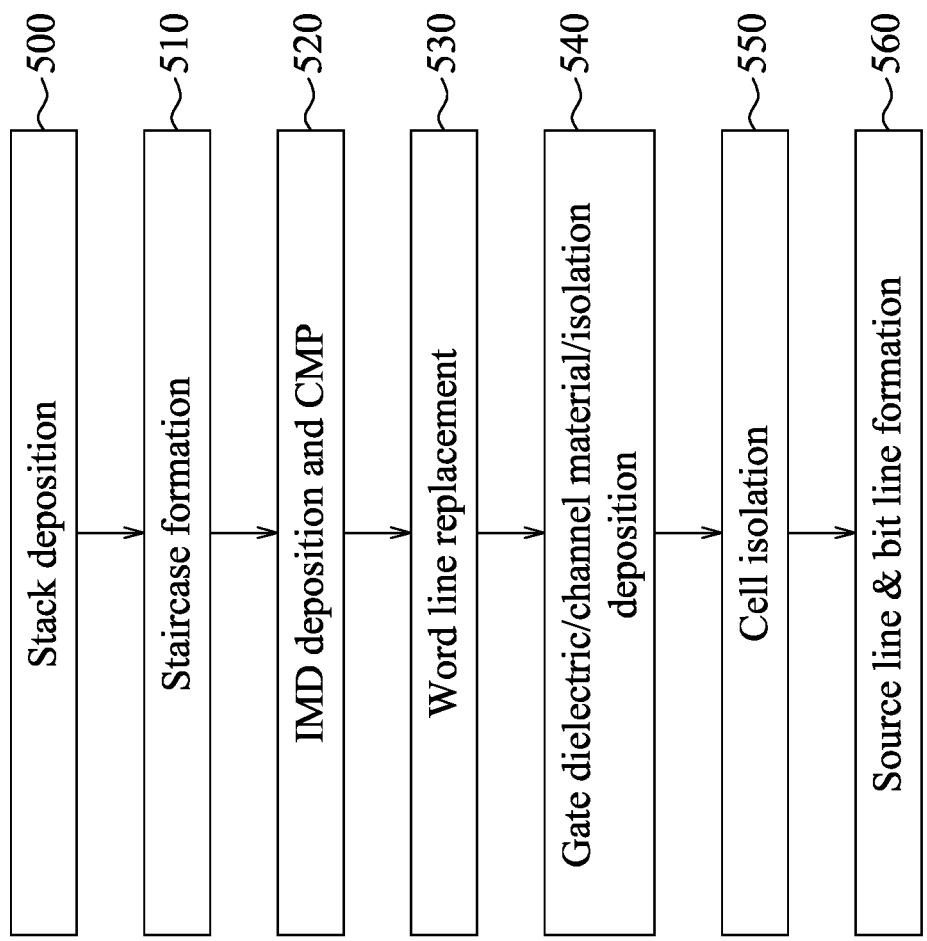
FIG. 13 is a flow chart illustrating a process for fabricating a 3D memory array in accordance with some embodiments.

FIG. 13 is a flow chart that cooperates with FIGS. 14 through 27 to illustrate an exemplary process for fabricating the 3D memory array according to this disclosure, where FIGS. 14, 16, 18, 20, 22, 24 and 26 illustrate a middle portion (middle as in the X-axis direction) of a single tableland feature 200 respectively in different steps, and FIGS. 15, 17, 19, 21, 23, 25 and 27 illustrate a corner portion of the single tableland feature 200 respectively in different steps.

Figure 14:
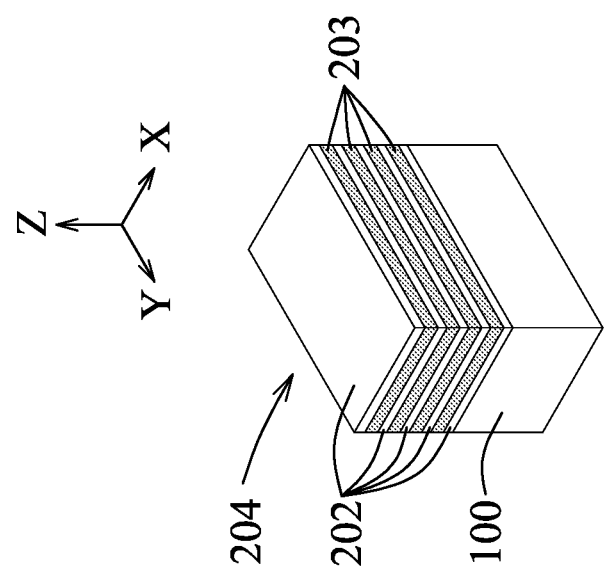
FIGS. 14 through 27 are schematic views that illustrate the process for fabricating a 3D memory array in accordance with some embodiments.
Figure 15:
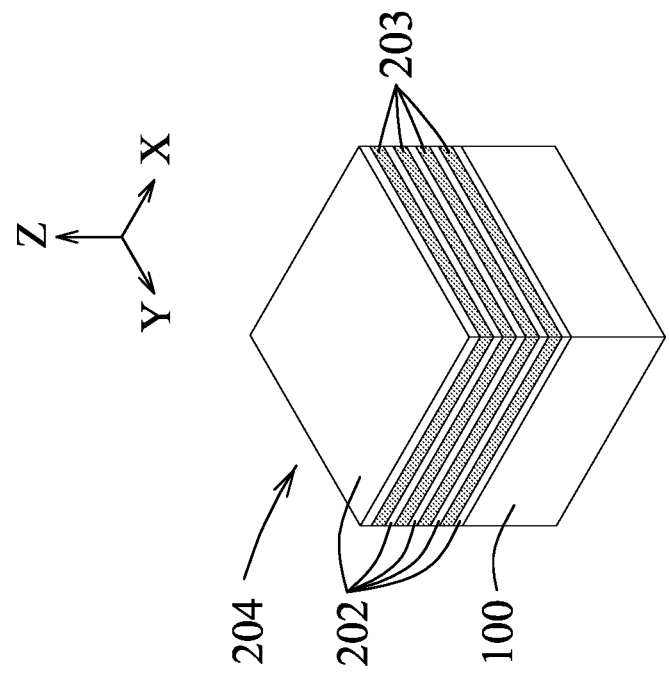

Referring to FIGS. 14 and 15, in step 500, multiple isolation layers 202 and multiple sacrificial layers 203 are alternately deposited to form a stack 204 on the substrate 100. Each of the isolation layers 202 may include, for example, $Si_xO_y$, $Si_xN_y$, $SiO_xN_y$, other suitable materials, or any combination thereof. Each of the sacrificial layers 203 may include, for example, $Si_xO_y$, $Si_xN_y$, $SiO_xN_y$, other suitable materials, or any combination thereof. However, the isolation layers 202 and the sacrificial layers 203 are made of different materials. In the illustrative embodiment, the isolation layers 202 are made of SiO2, and the sacrificial layers 203 are made of SiN, but this disclosure is not limited in this respect. The isolation layers 202 and the sacrificial layers 203 can be deposited using, for example but not limited to, chemical vapor deposition (CVD), plasma-enhanced chemical vapor deposition (PECVD), physical vapor deposition (PVD), atomic layer deposition (ALD), other suitable techniques, or a combination thereof.

Figure 16:
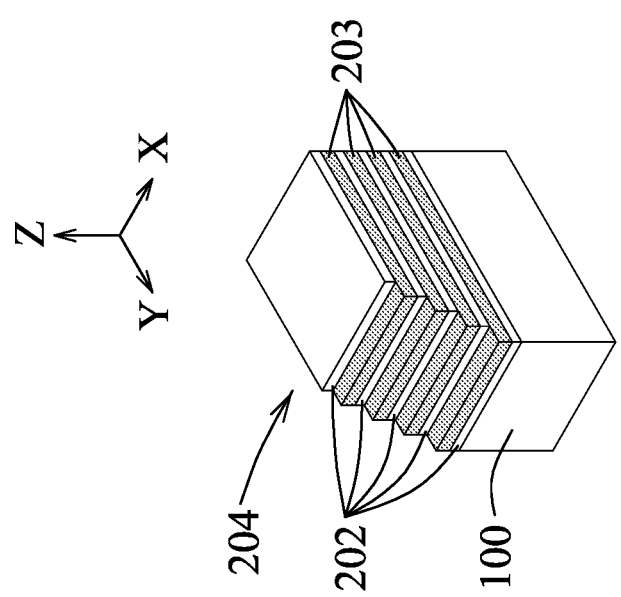
Figure 17:
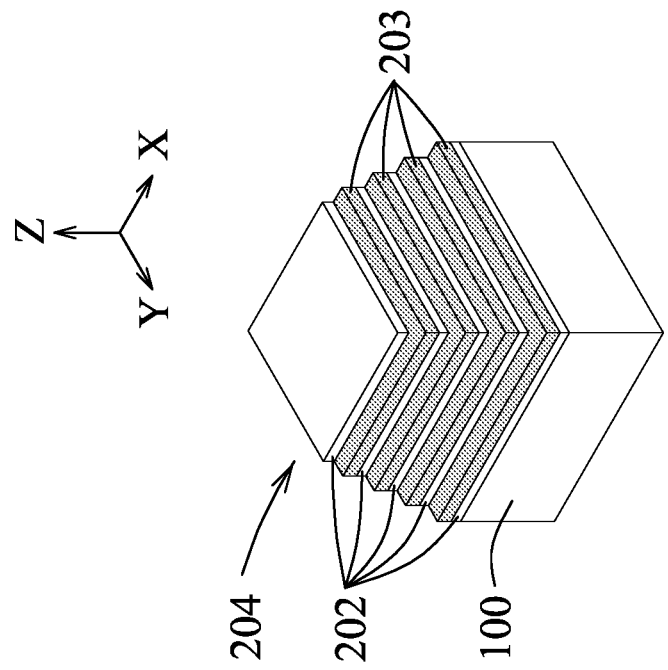

Referring to FIGS. 16 and 17, in 510 that follows step 500, a photoresist layer (not shown) is formed on the stack 204, and multiple photoresist trimming processes and etch processes are alternately performed to form staircase structures in the isolation layers 202 and the sacrificial layers 203. The etching of the isolation layers 202 and the sacrificial layers 203 may be performed using, for example, reactive ion etching (RIE), other suitable techniques, or any combination thereof.

Figure 19:
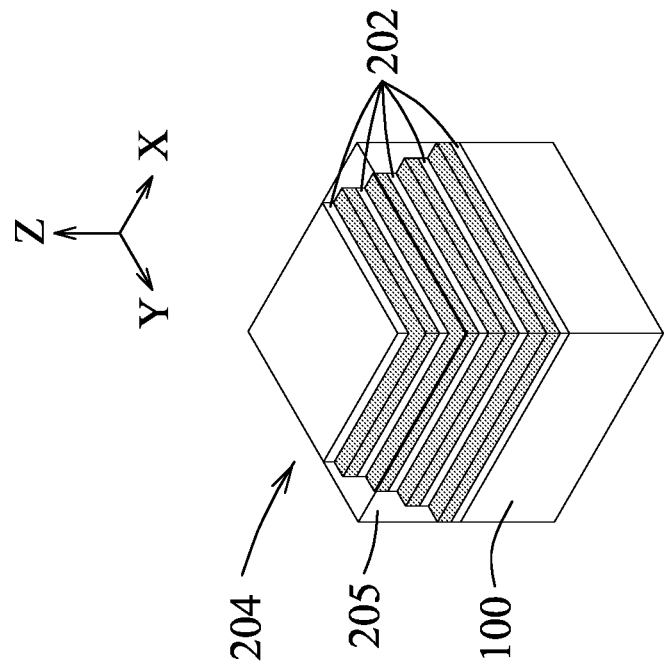
Figure 18:
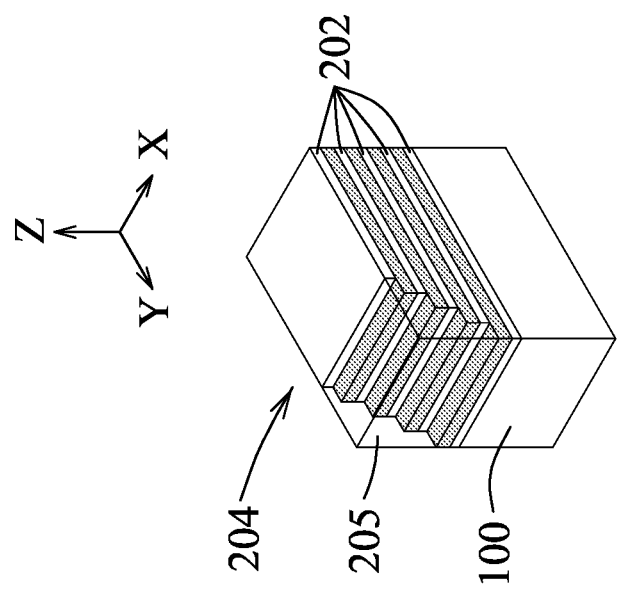

Referring to FIGS. 18 and 19, in step 520 that follows step 510, an inter-metal dielectric (IMD) layer 205 is formed on the stack 204, followed by a chemical-mechanical planarization (CMP) process to reveal the top one of the isolation layers 202. The IMD layer 205 may include, for example, phospho-silicate glass (PSG), boro-silicate glass (BSG), boron-doped phospho-silicate glass (BPSG), undoped silicate glass (USG), other suitable materials, or any combination thereof.

Figure 21:
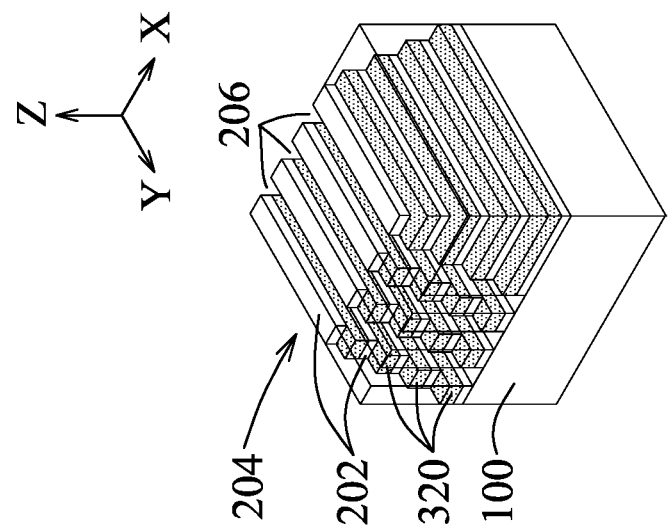
Figure 20:
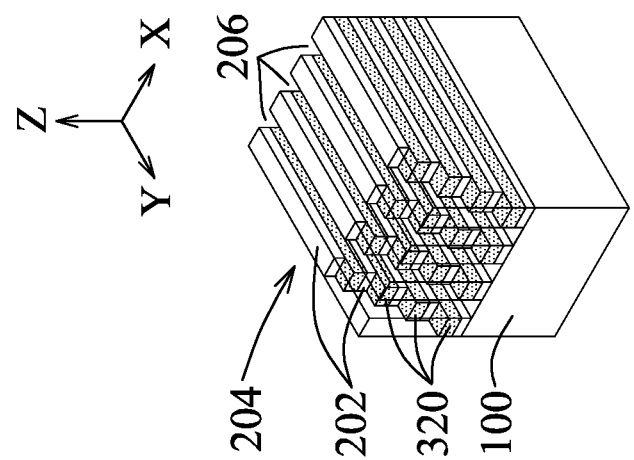

Referring to FIGS. 20 and 21, in step 530 that follows step 520, the stack 204 is partially etched to the substrate 100 to form a plurality of trenches 206 therein. The etching of the isolation layers 202 and the sacrificial layers 203 of the stack 204 may be performed using, for example, RIE, other suitable techniques, or any combination thereof. Subsequently, a word line replacement process is performed to replace the sacrificial layers 203 with metal to form the word lines 320. In the word line replacement process, the sacrificial layers 203 can be removed using, for example, wet etching, other suitable techniques, or any combination thereof. Then, a metal deposition process is performed using, for example, CVD, PECVD, ALD, PVD, other suitable techniques, or any combination thereof, so as to form the word lines 320 among the isolation layers 202. The word lines 320 may be made of, for example, copper, titanium, titanium nitride, tantalum, tantalum nitride, tungsten, ruthenium, aluminum, other suitable materials, or any combination thereof.

Figure 23:
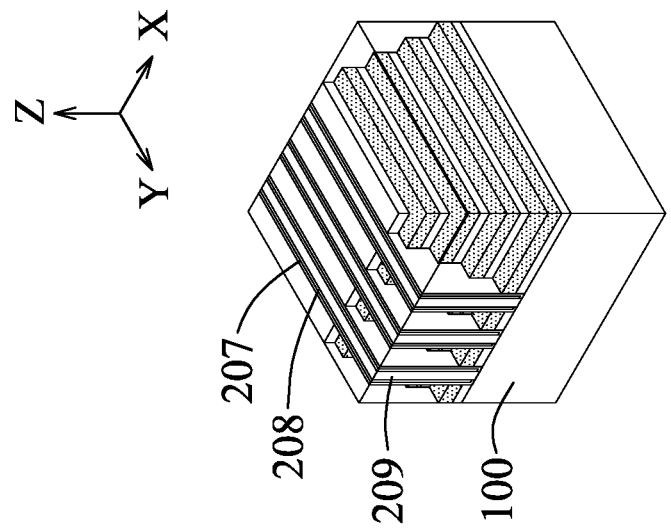
Figure 22:
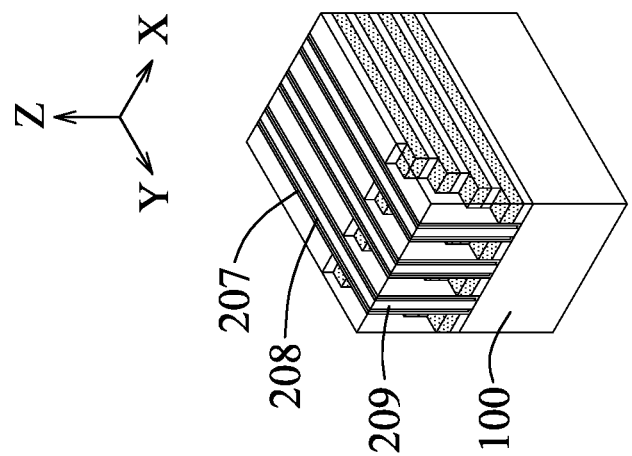

Referring to FIGS. 22 and 23, in step 540 that follows step 530, a gate dielectric layer 207 and a channel layer 208 are conformally formed in the trenches 206. In the illustrative embodiment, the gate dielectric layer 207 may include a ferroelectric material. In other embodiments, the gate dielectric layer 207 may include, for example, a high-k dielectric material, an oxide-nitride-oxide (ONO) structure, a nitride-oxide-nitride (NON) structure, SiON, SiN, other suitable materials, or any combination thereof. The channel layer 208 may include, for example, indium-comprising material (e.g., $In_xGa_yZn_zMO$, where M may be Ti, Al, Ag, Si, Sn, or the like; and X, Y, and Z may each be any value between 0 and 1), indium tungsten oxide (IWO), zinc oxide, polysilicon, other suitable materials, or any combination thereof. After the gate dielectric layer 207 and the channel layer 208 are conformally formed in the trenches 206, an isolation layer 209 is deposited to fill the trenches 206, followed by a CMP process. The isolation layer 209 may include, for example, $Si_xO_y$, $Si_xN_y$, $SiO_xN_y$, other suitable materials, or any combination thereof. In the illustrative embodiment, the isolation layer 209 is made of $SiO_2$.

Figure 25:
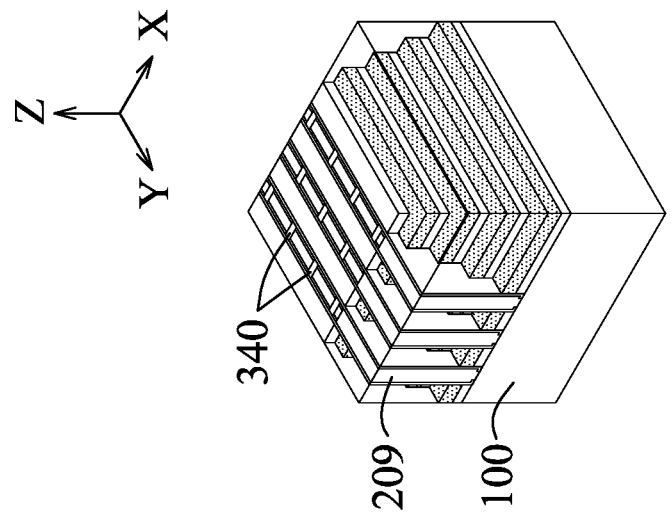
Figure 24:
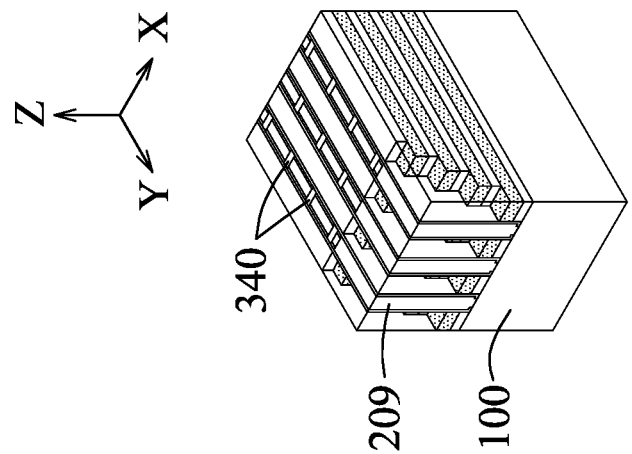

Referring to FIGS. 24 and 25, in step 550 that follows step 540, multiple cell isolation features 340 are formed to define and isolate the memory cells 330 that are aligned in the Y-axis direction. Formation of the cell isolation features 340 may include, for example but not limited to, etching the isolation layer 209 to define space for the cell isolation features 340, etching the channel layer 208 that is partially exposed from the space formed by etching the isolation layer 209 to form the channel features 334 (see FIGS. 4 and 5), and filling the space formed by etching the isolation layer 209 and the channel layer 208 with, for example but not limited to, $SiO_2$.

Figure 5:
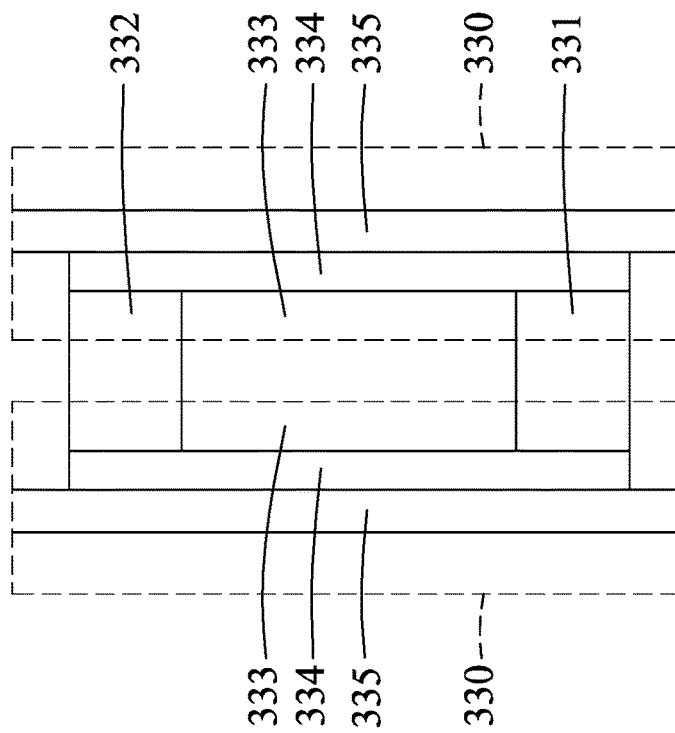
FIG. 5 illustrates a top view of memory cells of the 3D memory array as depicted in FIG. 1.
Figure 27:
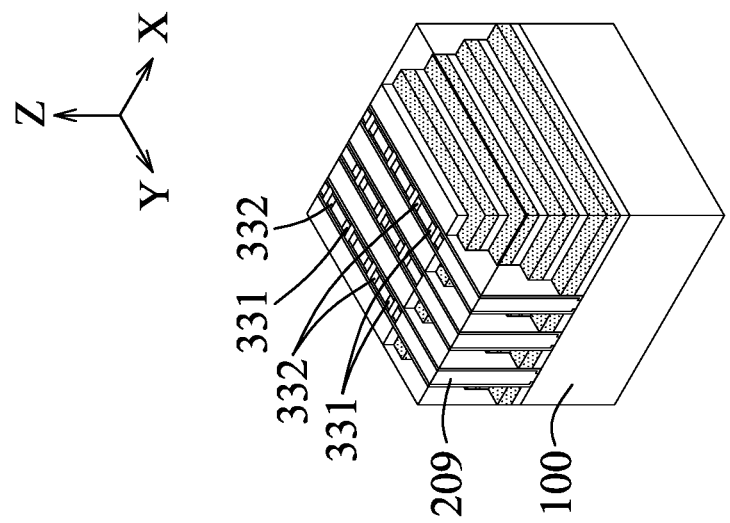
Figure 26:
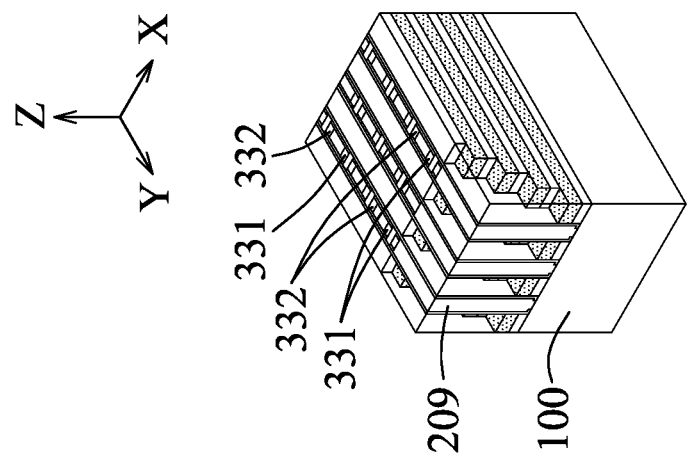

Referring to FIGS. 26 and 27, in step 560 that follows step 550, the isolation layer 209 is partially etched to the substrate 100 to define space for the bit lines 331 and the source lines 332 (see FIGS. 4 and 5). Subsequently, a metal deposition process is performed using, for example, CVD, PECVD, ALD, PVD, other suitable techniques, or any combination thereof, in order to form the bit lines 331 and the source lines 332 in the space thus defined. The bit lines 331 and the source lines 332 may be made of, for example, copper, titanium, titanium nitride, tantalum, tantalum nitride, tungsten, ruthenium, aluminum, other suitable materials, or a combination thereof.

After step 560, the bit-line connection wires 311 and the source-line connection wires 312 are formed as shown in FIGS. 1, 7, 10, 11 and 12. The bit-line connection wires 311 and the source-line connection wires 312 may be made of, for example, copper, titanium, titanium nitride, tantalum, tantalum nitride, tungsten, ruthenium, aluminum, other suitable materials, or a combination thereof, and may be deposited using, for example, CVD, PECVD, ALD, PVD, other suitable techniques, or any combination thereof.

Figure 28:
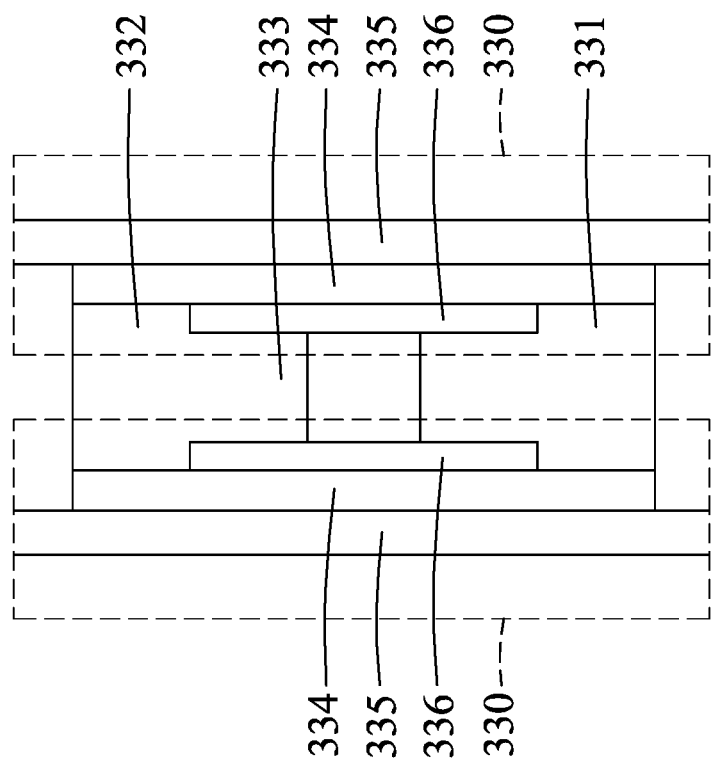
FIG. 28 illustrates a top view of a variation of memory cells of the 3D memory array in accordance with some embodiments.

It is noted that the embodiments of this disclosure are applicable to various designs for the memory cells 330. As an example, FIG. 28 illustrates another design for the memory cells 330 where the gate dielectric features 335 are made of a ferroelectric material. In comparison to the memory cells 330 shown in FIG. 5, each memory cell 330 in FIG. 28 further includes a dielectric feature 336 disposed on the channel feature 334. By virtue of the dielectric feature 336, the bit line 331 and the source line 332 can further extend inwardly, so as to enhance phase transition of the gate dielectric feature 335 when an electric field is applied between the source/drain electrode 331, 332 and the gate electrode of the TFT of the memory cell 330. The dielectric feature 336 may be made of, for example, aluminum oxide (AlO), other suitable high-k dielectric materials, or any combination thereof.

In summary, in accordance with some embodiments of this disclosure, by forming multiple 3D memory sub-arrays 300 in one tableland feature 200, staircases are not present between adjacent sub-arrays 300, and a number of the columns of the dummy memory cells 338 can be reduced, so as to save chip area.

In accordance with some embodiments, a 3D memory array includes a semiconductor substrate, a tableland feature formed over the semiconductor substrate, and a plurality of 3D memory sub-arrays that are formed in the tableland feature and that are arranged in an X-axis direction. For each of the 3D memory sub-arrays, the 3D memory sub-array includes a plurality of memory cells that are distributed in multiple columns extending in a Y-axis direction and arranged in the X-axis direction, a plurality of bit lines that extend in a Z-axis direction, a plurality of source lines that extend in the Z-axis direction, and a plurality of word lines that extend in the Y-axis direction, where the X-axis direction, the Y-axis direction and the Z-axis direction are transverse to each other; each of the memory cells includes a first electrode, a second electrode and a gate electrode; in each of the columns of the memory cells, the memory cells are distributed in multiple layers that are arranged in the Z-axis direction; each of the bit lines interconnects the first electrodes of some of the memory cells aligned in the Z-axis direction; each of the source lines interconnects the second electrodes of some of the memory cells aligned in the Z-axis direction; each of the word lines interconnects the gate electrodes of some of the memory cells aligned in the Y-axis direction; and each of the bit lines is electrically connected to another one of the bit lines, which is aligned with the bit line in the X-axis direction, of the 3D memory sub-array. For any two of the 3D memory sub-arrays in the tableland feature, each of the bit lines of one of the 3D memory sub-arrays is electrically isolated from the bit lines of the other one of the 3D memory sub-arrays.

In accordance with some embodiments, the tableland feature includes a plain portion, and a staircase portion that is connected to and surrounds the plain portions. The 3D memory sub-arrays are formed in the plain portion.

In accordance with some embodiments, the tableland feature includes multiple metal layers and multiple isolation layers that are alternately stacked in the Z-axis direction, and the word lines are formed by the metal layers.

In accordance with some embodiments, each of the word lines extends, in the staircase portion, outside of an area covered by any of the isolation layer(s) disposed over the word line.

In accordance with some embodiments, the 3D memory array further includes two columns of dummy memory cells that are formed in the plain portion and that sandwich the 3D memory sub-arrays therebetween in the X-axis direction.

In accordance with some embodiments, the 3D memory array further includes, for two of the 3D memory sub-arrays that are adjacent in the X-axis direction, a column of dummy memory cells disposed between said two of the 3D memory sub-arrays.

In accordance with some embodiments, the word lines are distributed in multiple columns that are separated from each other in the X-axis direction. In each of the columns of the word lines, the word lines are distributed in multiple layers that are arranged in the Z-axis direction.

In accordance with some embodiments, the substrate has a plurality of driving transistors formed therein, and each of the driving transistors is electrically connected to a corresponding one of the word lines for driving operation of those of the memory cells that are electrically connected to the word line.

In accordance with some embodiments, the tableland feature includes a plain portion, and a staircase portion that is connected to and surrounds the plain portions. The 3D memory sub-arrays are formed in the plain portion. The staircase portion includes, for any two of the columns of the word lines that are adjacent in the X-axis direction, a word-line isolation feature disposed between the two of the columns of the word lines. The 3D memory array further includes another tableland feature that is formed over the substrate, and that has an identical structure as the tableland feature. The word-line isolation feature of the tableland feature is connected to the word-line isolation feature of said another tableland feature.

In accordance with some embodiments, each of the 3D memory sub-arrays includes a plurality of bit-line connection wires and a plurality of source-line connection wires that extend in the X-axis direction. For each of the 3D memory sub-arrays, each of the bit-line connection wires interconnects some of the bit lines that are aligned in the X-axis direction, and each of the source-line connection wires interconnects some of the source lines that are aligned in the X-axis direction. For two of the 3D memory sub-arrays that are adjacent in the X-axis direction, each of the bit-line connection wires of one of the 3D memory sub-arrays is electrically isolated from any of the bit-line connection wires of the other one of the 3D memory sub-arrays.

In accordance with some embodiments, a 3D memory array includes a semiconductor substrate, a plurality of 3D memory sub-arrays that are formed over the semiconductor substrate and that are arranged in an X-axis direction, and an interconnecting feature that is formed over the semiconductor substrate, and that interconnects two of the 3D memory sub-arrays. For each of the 3D memory sub-arrays, the 3D memory sub-array includes a plurality of memory cells that are distributed in multiple columns extending in a Y-axis direction and arranged in the X-axis direction, a plurality of bit lines that extend in a Z-axis direction, a plurality of source lines that extend in the Z-axis direction, and a plurality of word lines that extend in the Y-axis direction, where the X-axis direction, the Y-axis direction and the Z-axis direction are transverse to each other; each of the memory cells includes a first electrode, a second electrode and a gate electrode; in each of the columns of the memory cells, the memory cells are distributed in multiple layers that are arranged in the Z-axis direction; each of the bit lines interconnects the first electrodes of some of the memory cells aligned in the Z-axis direction; each of the source lines interconnects the second electrodes of some of the memory cells aligned in the Z-axis direction; each of the word lines interconnects the gate electrodes of some of the memory cells aligned in the Y-axis direction; and each of the bit lines is electrically connected to another one of the bit lines, which is aligned with the bit line in the X-axis direction, of the 3D memory sub-array. For any two of the 3D memory sub-arrays, each of the bit lines of one of the 3D memory sub-arrays is electrically isolated from the bit lines of the other one of the 3D memory sub-arrays. The interconnecting feature has multiple metal layers and multiple isolation layers that are alternately stacked together in the Z-axis direction.

In accordance with some embodiments, each of the 3D memory sub-arrays includes multiple word-line regions and multiple cell regions that are alternately arranged in the X-axis direction, and that cooperatively form the memory cells. For each of the 3D memory sub-arrays, each of the word-line regions has a stack structure composed of multiple metal layers and multiple isolation layers that are alternately stacked together in the Z-axis direction; each of the cell regions includes a gate dielectric feature formed on a sidewall of one of the word-line regions that is adjacent to the cell region, and a channel feature formed on the gate dielectric feature; and the channel feature is in contact with one of the bit lines and one of the source lines.

In accordance with some embodiments, the interconnecting feature has a same structure as one of the word-line regions.

In accordance with some embodiments, the interconnecting feature includes multiple interconnecting word-line regions and at least one dummy cell region that are alternately disposed in the X-axis direction. Each of the interconnecting word-line regions has a same structure as one of the word-line regions of the 3D memory sub-arrays. Each of the at least one dummy cell region has a same structure as one of the cell regions of the 3D memory sub-arrays.

In accordance with some embodiments, the 3D memory array further includes two columns of dummy memory cells that sandwich the 3D memory sub-arrays and the interconnecting feature therebetween in the X-axis direction.

In accordance with some embodiments, the 3D memory array further includes a staircase feature that is connected to and surrounds the 3D memory sub-arrays and the interconnecting feature.

In accordance with some embodiments, the staircase feature includes multiple metal layers and multiple isolation layer that are alternately stacked together in the Z-axis direction, and the metal layers are formed with a plurality of word-line extensions that are electrically connected to the word lines of the 3D memory sub-arrays, respectively.

In accordance with some embodiments, each of the word-line extensions extends outside of an area covered by any of the isolation layer(s) of the staircase feature disposed over the word-line extension.

In accordance with some embodiments, a method for forming a 3D memory array is provided. In one step, multiple isolation layers and multiple sacrificial layers are deposited to be alternately stacked in a Z-axis direction on a substrate to form a stack feature. In one step, a plurality of trenches are formed in the stack feature. The sacrificial layers are replaced with metal to form a plurality of word lines that extend in a Y-axis direction perpendicular to the Z-axis direction. In one step, a gate dielectric layer and a channel layer are conformally formed in the trenches. In one step, multiple bit lines and multiple source lines are formed to extend in the Z-axis direction in the trenches. The bit lines and the source lines cooperate with the word lines, the gate dielectric layer and the channel layer to form a plurality of memory cells that are distributed in multiple columns extending in the Y-axis direction and equidistantly arranged in an X-axis direction perpendicular to the Y-axis direction and the Z-axis direction. In one step, a plurality of first bit-line connection wires are formed to extend in the X-axis direction and are arranged in the Y-axis direction, and a plurality of second bit-line connection wires are formed to extend in the X-axis direction, and are arranged in the Y-axis direction. The second bit-line connection wires are spaced apart from the first bit-line connection wires in the X-axis direction, and are electrically isolated from the first bit-line connection wires. Each of the memory cells includes a first electrode, a second electrode and a gate electrode. In each of the columns of the memory cells, the memory cells are distributed in multiple layers that are arranged in the Z-axis direction. Each of the bit lines interconnects the first electrodes of some of the memory cells aligned in the Z-axis direction. Each of the source lines interconnects the second electrodes of some of the memory cells aligned in the Z-axis direction. Each of the word lines interconnects the gate electrodes of some of the memory cells aligned in the Y-axis direction. Each of the first bit-line connection wires interconnects some of the bit lines that are aligned in the X-axis direction. Each of the second bit-line connection wires interconnects some of the bit lines that are aligned in the X-axis direction.

In accordance with some embodiments, after depositing the isolation layers and the sacrificial layers, the stack feature is etched to form a staircase feature, and the memory cells are connected to and surrounded by the staircase feature The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming a three-dimensional (3D) memory array, comprising steps of:
    depositing multiple isolation layers and multiple sacrificial layers that are alternately stacked in a Z-axis direction on a substrate to form a stack feature;
    forming a plurality of trenches in the stack feature;
    replacing the sacrificial layers with metal while the trenches remain to form a plurality of word lines that extend in a Y-axis direction;
    conformally forming a gate dielectric layer and a channel layer in the trenches; and
    forming multiple bit lines and multiple source lines that extend in the Z-axis direction in the trenches, the bit lines and the source lines cooperating with the word lines, the gate dielectric layer and the channel layer to form a plurality of memory cells that are distributed in multiple columns extending in the Y-axis direction and equidistantly arranged in an X-axis direction; and
    forming a plurality of first bit-line connection wires that extend in the X-axis direction and that are arranged in the Y-axis direction, and a plurality of second bit-line connection wires that extend in the X-axis direction and that are arranged in the Y-axis direction, wherein the second bit-line connection wires are spaced apart from the first bit-line connection wires in the X-axis direction, and are electrically isolated from the first bit-line connection wires;
    wherein:
        the X-axis direction, the Y-axis direction and the Z-axis direction are transverse to each other;
        each of the memory cells includes a first electrode, a second electrode and a gate electrode;
        in each of the columns of the memory cells, the memory cells are distributed in multiple layers that are arranged in the Z-axis direction;
        each of the bit lines interconnects the first electrodes of some of the memory cells aligned in the Z-axis direction;
        each of the source lines interconnects the second electrodes of some of the memory cells aligned in the Z-axis direction;
        each of the word lines interconnects the gate electrodes of some of the memory cells aligned in the Y-axis direction;
        each of the first bit-line connection wires interconnects some of the bit lines that are aligned in the X-axis direction;
        each of the second bit-line connection wires interconnects some of the bit lines that are aligned in the X-axis direction, and
    wherein the first bit-line connection wires interconnect a first group of the bit lines, the second bit-line connection wires interconnect a second group of the bit lines, and one of the columns of the memory cells is disposed between the first group of the bit lines and the second group of the bit lines.

2. The method according to claim 1, further comprising, after depositing the isolation layers and the sacrificial layers, a step of etching the stack feature to form a staircase feature, wherein the memory cells are connected to and surrounded by the staircase feature.

3. The method according to claim 2, wherein the step of etching the stack feature is performed before the forming of the trenches, and includes multiple photoresist trimming processes and multiple etching processes that are alternately performed, thereby forming the staircase feature.

4. The method according to claim 2, further comprising, after the staircase feature is formed and before the forming of the trenches, depositing an inter-metal dielectric (IMD) layer on the stack feature, and revealing a top one of the isolation layers.

5. The method according to claim 1, further comprising, after the step of forming the gate dielectric layer and the channel layer, steps of:
    depositing a trench-filling isolation layer to fill the trenches;
    etching the trench-filling isolation layer to expose a part of the channel layer; and
    etching the part of the channel layer to form channel features of the memory cells.

6. The method according to claim 5, further comprising steps of:
    etching the trench-filling isolation layer to form a space for the bit lines and the source lines; and
    depositing metal in the space to form the bit lines and the source lines.

7. The method according to claim 1, further comprising: forming a plurality of first source-line connection wires that extend in the X-axis direction and that are arranged in the Y-axis direction, and a plurality of second source-line connection wires that extend in the X-axis direction and that are arranged in the Y-axis direction, wherein the second source-line connection wires are spaced apart from the first source-line connection wires in the X-axis direction, and are electrically isolated from the first source-line connection wires;
- wherein each of the first source-line connection wires interconnects some of the source lines that are aligned in the X-axis direction; and
- wherein each of the second source-line connection wires interconnects some of the source lines that are aligned in the X-axis direction.

8. The method according to claim 7, wherein the first bit-line connection wires and the first source-line connection wires are alternately arranged, and the second bit-line connection wires and the second source-line connection wires are alternately arranged.

9. The method according to claim 1, wherein the memory cells in adjacent two of the columns are staggered.

10. A method for forming a three-dimensional (3D) memory array, comprising steps of:
- forming a staircase structure on a substrate, wherein the staircase structure includes a plurality of isolation layers spaced apart from each other, and the staircase structure has a first staircase portion, a second staircase portion opposite to the first staircase portion, a third staircase portion interconnecting an edge of the first staircase portion and an edge of the second staircase portion, and a fourth staircase portion opposite to the third staircase portion and interconnecting another edge of the first staircase portion and another edge of the second staircase portion;
- forming a plurality of word line layers in the staircase structure, wherein the isolation layers and the word line layers are alternately stacked together, and each of the word line layers includes a first group of word lines and a second group of word lines;
- forming, for each of the word line layers, a gate dielectric layer, a channel layer, a plurality of bit lines, and a plurality of source lines among the first group of word lines and among the second group of word lines; and
- forming a first group of bit-line connection wires, a second group of bit-line connection wires, a first group of source-line connection wires, and a second group of source-line connection wires, wherein the first group of bit-line connection wires are connected to those of the bit lines among the first group of word lines, the second group of bit-line connection wires are connected to those of the bit lines among the second group of word lines, the first group of source-line connection wires are connected to those of the source lines among the first group of word lines, and the second group of source-line connection wires are connected to those of the source lines among the second group of word lines; and
- wherein the first group of bit-line connection wires are spaced apart from the second group of bit-line connection wires, and the first group of source-line connection wires are spaced apart from the second group of source-line connection wires.

11. The method according to claim 10, wherein the staircase structure further includes a plurality of sacrificial layers that are alternately stacked with the isolation layers, and the forming of the word line layers includes replacing the sacrificial layers with metal.

12. The method according to claim 11, wherein the forming of the word line layers further includes, before replacing the sacrificial layers with metal, etching the staircase structure to form a plurality of trenches from which the sacrificial layers are exposed.

13. The method according to claim 10, wherein, for each of the word line layers, the first group of word lines and the second group of word lines have a common word line.

14. The method according to claim 10, wherein, for each of the word line layers, the first group of word lines are disposed side by side and are spaced apart from the second group of word lines.

15. A method for forming a three-dimensional (3D) memory array, comprising steps of:
- forming a staircase structure on a substrate, wherein the staircase structure includes a plurality of isolation layers spaced apart from each other, and the staircase structure has a first staircase portion, a second staircase portion opposite to the first staircase portion, a third staircase portion interconnecting an edge of the first staircase portion and an edge of the second staircase portion, and a fourth staircase portion opposite to the third staircase portion and interconnecting another edge of the first staircase portion and another edge of the second staircase portion;
- forming a plurality of layers of memory cells in the staircase structure, wherein the layers of the memory cells are spaced apart from each other by the isolation layers, and each of the layers of memory cells includes a first group of memory cells, and a second group of memory cells; and
- forming a first group of bit-line-source-line-connection-wire pairs that are connected to the first group of memory cells and that extend in a first direction, and a second group of bit-line-source-line-connection-wire pairs that are connected to the second group of memory cells and that extend in the first direction;
- wherein the first group of bit-line-source-line-connection-wire pairs are spaced apart from the second group of bit-line-source-line-connection-wire pairs in the first direction.

16. The method according to claim 15, wherein, for each of the layers of memory cells, the first group of memory cells are adjacent to the second group of memory cells.

17. The method according to claim 16, wherein the first group of memory cells include a plurality of columns of memory cells that are evenly spaced at a distance along the first direction, the second group of memory cells include a plurality of columns of memory cells that are evenly spaced at the distance along the first direction, and the first group of memory cells and the second group of memory cells are spaced apart from each other by the distance along the first direction.

18. The method according to claim 15, wherein each of the layers of memory cells further includes a third group of memory cells that are disposed between the first group of memory cells and the second group of memory cells, and that are spaced apart from the first group of bit-line-source-line-connection-wire pairs and the second group of bit-line-source-line-connection-wire pairs.

19. The method according to claim 15, wherein each of the layers of memory cells further includes a column of memory cells disposed between the first group of memory cells and the second group of memory cells.

20. The method according to claim 15, wherein each of the layers of memory cells further includes two columns of dummy memory cells, and the first group of memory cells and the second group of memory cells are disposed between the two columns of dummy cells.

\* \* \* \* \*